United States Patent
Okumura

(10) Patent No.: US 9,667,721 B2
(45) Date of Patent: May 30, 2017

(54) RELAYING DEVICE, IMAGE PROCESSING DEVICE, AND SYSTEM COMPRISING IMAGE PROCESSING DEVICE AND RELAYING DEVICE

(71) Applicant: BROTHER KOGYO KABUSHIKI KAISHA, Nagoya-shi, Aichi-ken (JP)

(72) Inventor: Fumio Okumura, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 187 days.

(21) Appl. No.: 14/499,377

(22) Filed: Sep. 29, 2014

(65) Prior Publication Data

US 2015/0095411 A1 Apr. 2, 2015

(30) Foreign Application Priority Data

Sep. 30, 2013 (JP) .................................. 2013-205388

(51) Int. Cl.
*H04L 29/08* (2006.01)
*H04L 29/06* (2006.01)

(52) U.S. Cl.
CPC .......... *H04L 67/1097* (2013.01); *H04L 67/06* (2013.01); *H04L 67/2823* (2013.01); *H04L 67/42* (2013.01)

(58) Field of Classification Search
CPC . H04L 67/06; H04L 67/2823; H04L 67/1097; H04L 67/42
See application file for complete search history.

(56) References Cited

U.S. PATENT DOCUMENTS

| 2006/0274365 A1* | 12/2006 | Tanimoto | H04N 1/00127 358/1.15 |
| 2007/0288704 A1* | 12/2007 | Mizuno | H04N 1/00222 711/154 |
| 2008/0174806 A1 | 7/2008 | Singh et al. | |

(Continued)

FOREIGN PATENT DOCUMENTS

| JP | 2005-49933 A | 2/2005 |
| JP | 2008-182672 A | 8/2008 |
| JP | 2008-229993 A | 10/2008 |

OTHER PUBLICATIONS

Japanese Office Action issued in corresponding Japanese Patent Application No. 2013-205388, mailed Feb. 21, 2017.

*Primary Examiner* — Aaron Strange
(74) *Attorney, Agent, or Firm* — Merchant & Gould P.C.

(57) ABSTRACT

A relaying device may receive content data from a particular image processing device. The relaying device may send, to a server device, the received content data and a first particular instruction instructing to store the received content data in a first storage mode in the server device. The relaying device may send first screen information to the particular image processing device. The first screen information includes instructions for displaying a first screen on a display provided in the particular image processing device, and for accepting a changing instruction to change the first storage mode to a second storage mode. The relaying device may send second particular instruction to the server device in a case that a first information is received. The second particular instruction may instruct to store the content data in the server device in the second storage mode.

22 Claims, 13 Drawing Sheets

(56) References Cited

U.S. PATENT DOCUMENTS

2009/0161132 A1* 6/2009 Sato .................. H04N 1/00222
 358/1.9
2014/0082376 A1* 3/2014 Roden ................ H04L 67/1097
 713/193

* cited by examiner

FIG. 9

| | Device Identification Information | Service Identification Information | First Storage Mode | Related Information |
|---|---|---|---|---|
| 1 | MAC Address 1 | Service A | File Name Use Mode | division_1, division_2 |
| 2 | MAC Address 2 | Service B | Tag Data Use Mode | 20130921_1, 20130921_2 |
| 3 | MAC Address 3 | Service A | Folder Use Mode | division |
| 4 | MAC Address 4 | Service B | Note Use Mode | 20130903 |
| ... | ... | ... | ... | ... |

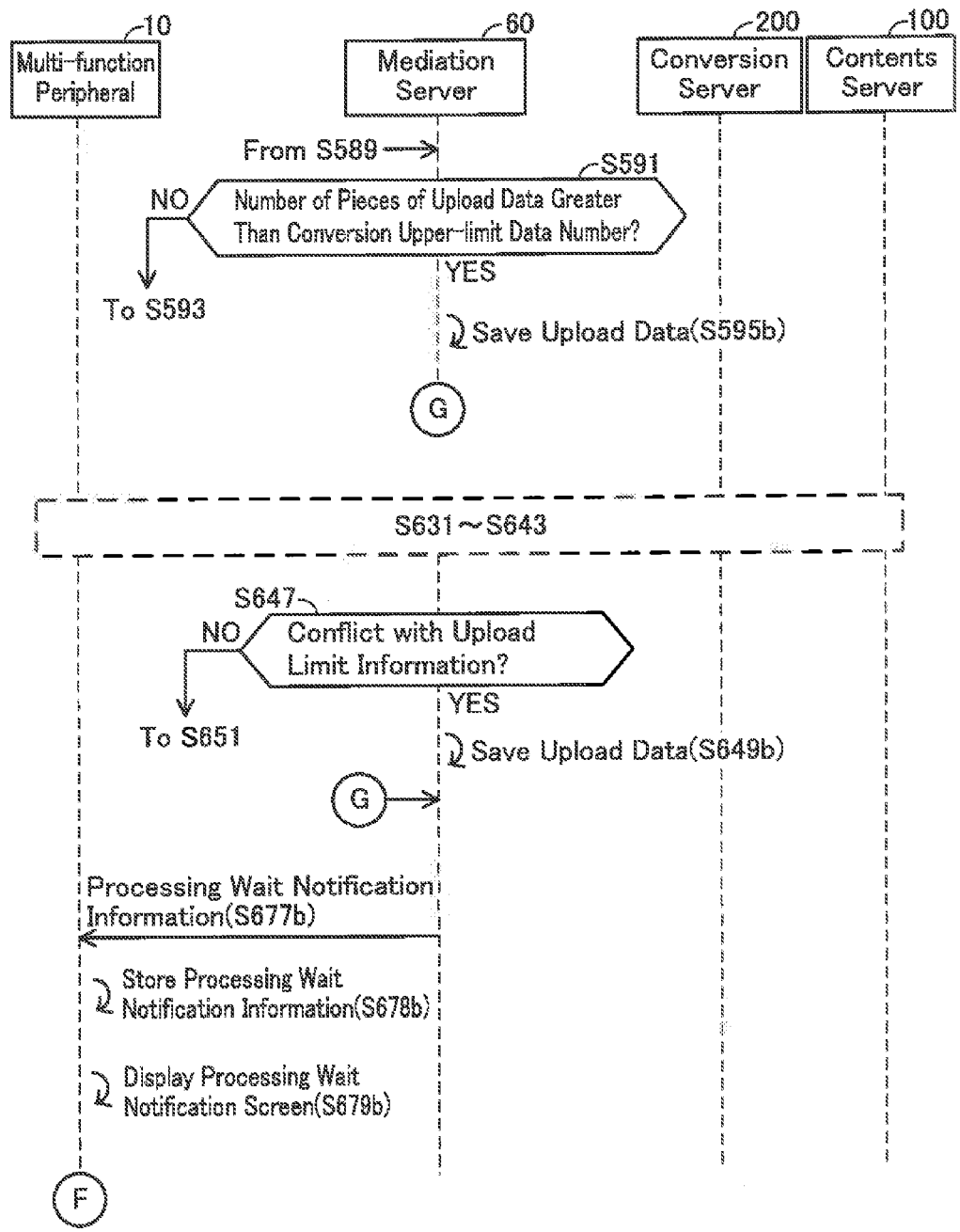

RELAYING DEVICE, IMAGE PROCESSING DEVICE, AND SYSTEM COMPRISING IMAGE PROCESSING DEVICE AND RELAYING DEVICE

CROSS-REFERENCE TO RELATED APPLICATION

This application claims priority to Japanese Patent Application No. 2013-205388, filed on Sep. 30, 2013, the contents of which are hereby incorporated by reference into the present application.

TECHNICAL FIELD

The present specification discloses a relaying device connected with an image processing device and a server via a network.

DESCRIPTION OF RELATED ART

In recent years, an electronic file storing service capable of storing an electronic file in a storage server on a network has been widespread.

SUMMARY

A configuration is known in which data outputted from an image processing device is relayed and stored onto a server by a relaying device. In such a configuration, there is a risk that a situation may arise, for certain reasons on the server, where the data received from the image processing device is stored by the relaying device in a storage mode in which a user does not expect the data to be stored.

In one aspect of the teachings disclosed herein, a relaying device may be provided. The relaying device may comprise: a network interface configured to connect with a network; a processor coupled to the network interface; and a memory storing computer-readable programs. The computer-readable programs, when executed by the processor, nay cause the relaying device to perform receiving content data from a particular image processing device via the network interface. The computer-readable programs may cause the relaying device to perform sending, to a server device which is connected with the network via the network interface, the received content data and a first particular instruction. The first particular instruction may instruct to store the received content data in a first storage mode in the server device. The first storage mode may be set from among a plurality of storage modes. The computer-readable programs may cause the relaying device to perform sending first screen information to the particular image processing device via the network interface after sending the received content data to the server device. The first screen information may include instructions for displaying a first screen on a display provided in the particular image processing device, and for accepting a changing instruction to change the first storage mode to a second storage mode. The computer-readable programs may cause the relaying device to perform receiving first information from the particular image processing device via the network interface after sending the first screen information to the particular image processing device. The first information may indicate that the changing instruction is accepted. The computer-readable programs may cause the relaying device to perform sending second particular instruction to the server device in a case that the first information is received. The second particular instruction may instruct to store the content data in the server device in the second storage mode.

BRIEF DESCRIPTION OF DRAWINGS

FIG. 9 shows an example of a division information database;

FIG. 18 shows a sequence diagram of a modification of various processing executed by each device.

EMBODIMENT

System Configuration

Figure 1:
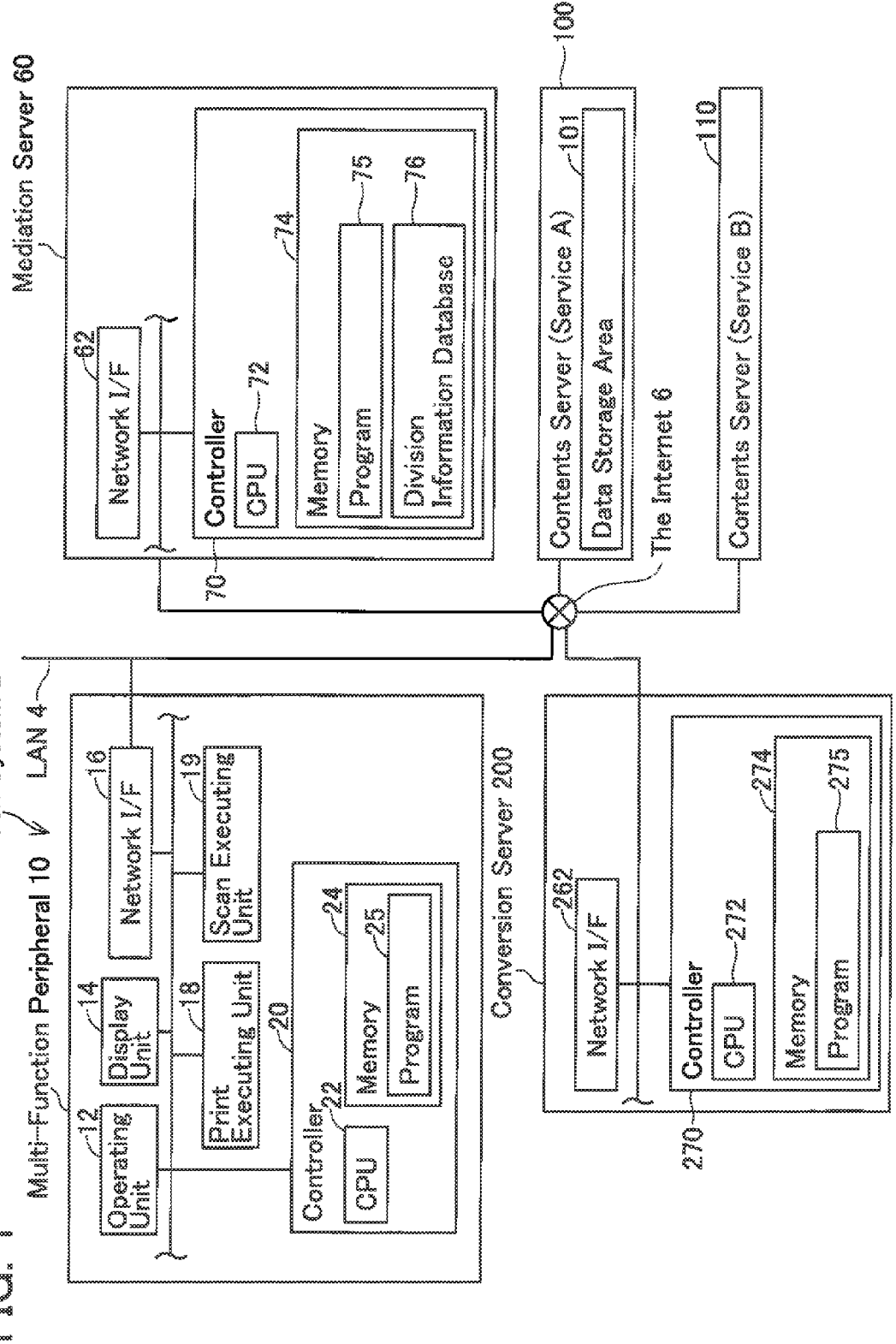
FIG. 1 shows the configuration of a communication system.

As shown in FIG. 1, a communication system 2 includes a multi-function peripheral 10, a mediation server 60, contents servers 100 and 110, and a conversion server 200. The multi-function peripheral 10 is connected with a LAN 4. The mediation server 60, the contents servers 100 and 110, and the conversion server 200 are connected with the Internet 6.

The multi-function peripheral 10, the mediation server 60, and the conversion server 200 perform communication by, e.g., HTTP (referred to as HyperText Transfer Protocol) or HTTPS (referred to as HyperText Transfer Protocol Secure). More specifically, the multi-function peripheral 10 operates as a HTTP client. The conversion server 200 operates as a HTTP server. On the other hand, the mediation server 60 operates as a HTTP server in communication with the multi-function peripheral 10, and operates as a HTTP client in communication with the conversion server 200, thereby being capable of executing communication with the multi-function peripheral 10 and communication with the conversion server 200 without being obstructed by a firewall or the like provided in the LAN 4, etc.

(Structure of Multi-Function Peripheral 10)

The multi-function peripheral 10 may execute a Printing function, a Scan function, a Copy function, a FAX function, or the like. The multi-function peripheral 10 comprises an operating unit 12, a display unit 14, a network interface (described as "I/F," hereinafter) 16, a print executing unit 18, a scan executing unit 19, and a controller 20. The operating unit 12 has a plurality of keys. A user can input various instructions to the multi-function peripheral 10 by operating the operating unit 12. The display unit 14 is a display for displaying various pieces of information. The network I/F 16 is connected to the LAN 4. The print executing unit 18 comprises an inkjet or laser printing mechanism. The scan executing unit 19 comprises a scan mechanism such as a CCD or CIS. The controller 20 comprises a CPU 22 and a memory 24. The CPU 22 executes various processes in accordance with program 25 stored in the memory 24. The memory 24 may be a computer readable storage medium. The computer readable storage medium is a non-transitory medium, such as a ROM, RAM, flash memory, hard disk, etc. An electrical signal carrying a program to be downloaded from a server, etc. on the Internet is not included in the non-transitory medium.

(Structure of Mediation Server 60)

The mediation server 60 is a server independent of the conversion server 200 and the contents servers 100 and 110. The mediation server 60 is a server for mediating supply of image data from the contents servers 100 and 110 to the multi-function peripheral 10. The mediation server 60 is a server provided by a vendor of the multi-function peripheral 10. The mediation server 60 includes a network I/F 62 and a controller 70. The controller 70 includes a CPU 72 and a memory 74. The CPU 72 performs various processing in accordance with a program 75 stored in the memory 74. As with the memory 24, the memory 74 may be a computer readable storage medium.

The division information database 76 is a database in which to store division information regarding executed data division processing, if any, by the mediation server 60. Data division processing is processing in which a single data aggregate having plural pieces of converted data or plural pieces of upload data is divided into a plurality of groups on the mediation server 60, and then the plurality of groups are save-uploaded to the contents server 100 or 110. Examples of the single data aggregate include plural pieces of upload data generated by scanning a single document containing a plurality of pages and plural pieces of converted data generated by executing conversion processing on plural pieces of upload data. Further, data division processing is processing that is executed regardless of the presence or absence of a processing execution command from the multi-function peripheral 10. Further, examples of a case that data division processing is executed by the mediation server 60 include a case that the total amount of data of a single data aggregate is larger than an upper-limit amount of data, i.e. the amount of data that the contents server 100 or 110 is capable of obtaining through a series of uploading processing that is performed in accordance with a single upload instruction. Specific examples of the total amount of data include the total size of converted data or upload data, and the total number of pieces of converted data or upload data.

FIG. 9 shows an example of the division information database 76. The division information database 76 has stored therein device identification information 411, service identification information 412, first storage mode 413, and related information 414. Device identification information 411 is information to identify a device having outputted upload data. An example of device identification information 411 is an MAC address. Service identification information 412 is information to identify a divided upload service, i.e. a service to which converted data or upload data divided into a plurality of groups have been uploaded. An example of service identification information 412 is a service name.

The first storage mode 413 is a storage mode for associating plural pieces of converted data or plural pieces of upload data with each other in order to indicate that converted data or upload data divided into a plurality of groups by data division processing is contained in a single data aggregate. The first storage mode 413 is determined by the mediation server 60. Related information 414 is information that is used for association of converted data or upload data. For example, in a case that the first storage mode 413 is a file name use mode or a tag data use mode, file names or tag data containing the same character string may be added to the pieces of converted data or upload data contained in each of the groups thus divided. For example, related information 414 including a character string "division_1" may be added to the end of each of the file names or tag data of the pieces of converted data or upload data divided into a first group. Further, related information 414 including a character string "division_2" may be added to the end of each of the file names or tag data of the pieces of converted data or upload data divided into a second group. Further, for example, in a case that the first storage mode 413 is a folder use mode or a note use mode, the pieces of converted data or upload data divided into the first group and the pieces of converted data or upload data divided into the second group may be stored in the same folder or note. The term "note" here means a storage area in which plural pieces of data can be stored in a sorted and organized manner, together with plural pieces of related data.

(Structure of the Conversion Server 200)

The conversion server 200 is a server configured as a separate entity from the mediation server 60 and the contents servers 100 and 110. The conversion server 200 may be a server which is provided to a vendor of the multi-function peripheral 10. The conversion server 200 comprises a network interface 262 and a controller 270. The controller 270 comprises a CPU 272 and memory 274. The memory 274 stores a program 275. The CPU 272 executes various processing according to the program 275. As with the memory 24, the memory 274 may be a computer readable storage medium.

The conversion server 200 is a server for executing the conversion processing to be described later on various types of data. Conversion processing is processing in which upload data is converted into converted data having a data format that is identified by selected data format instruction information. It should be noted that processing in which upload data is uploaded to the conversion server 200 for conversion processing is sometimes called "conversion upload". Further, processing in which upload data is uploaded to a contents server for storage is sometimes called "save uploading". A specific example of conversion processing is processing in which data in a word-processing software format is converted into data in a JPEG format.

Some features relating to the description in the present specification are hereby explained. In the present specification, the description "the CPU 72 of the mediation server 60 receives various information" includes the technical meaning "the CPU 72 of the mediation server 60 receives various information via the network interface 62". Further, the description "the CPU 72 of the mediation server 60 sends various information" includes the technical meaning "the CPU 72 of the mediation server 60 outputs various information via the network interface 62". Similar features exist regarding the CPU 272 of the conversion server 200 and the network interface 262. Similar features exist regarding the CPU 22 of the multi-function peripheral 10 and the network interface 16.

Here, a definition of the words "data" and "information" will be explained. In the present specification, "information" is used as a concept superordinate to "data". Consequently, "A data" may be rephrased as "A information". Further, even if the "information" has a different format as "data" (e.g., text format, binary format, flag format, etc.), this is treated as the same information as long as it is recognized that the meaning is the same. For example, as long as the device treats this as information indicating that the number of print copies is two parts, data of the text format "COPY=2", and data of the binary format "10" is the same information.

In the present specification, a case is explained in which the mediation server 60 and conversion server 200 are connected by the Internet 6 (that is, when a device functioning as the mediation server 60 and a device functioning as the conversion server 200 are disposed at physically distant positions), but other configurations are possible. The mediation server 60 and conversion server 200 may be realized as a single server. In this case, in the single server, a program which functions as the mediation server 60 and a program which functions as the conversion server 200 run, and communication between the programs is performed via a bus in the server. When the mediation server 60 and conversion server 200 are realized as a single server, in the present specification, communication which is explained as communication between the mediation server 60 and the conversion server 200 may be taken to mean communication between the program which functions as the mediation server 60 and the program which functions as the conversion server 200. Further, a configuration may be realized in which a program which functions as the mediation server 60, and moreover also functions as the conversion server 200, runs on a single server. In this case, in the present specification, communication which is explained as communication between the mediation server 60 and the conversion server 200 may replaced with passing of data within the program which functions as the mediation server 60 and which moreover functions as the conversion server 200.

(Structure of Contents Servers 100 and 110)

The contents servers 100 and 110 each are a server used for an online service provided by the vender of the multi-function peripheral 10. The contents servers 100 and 110 are so called storage servers. Note that the contents servers 100 and 110 may be servers used for an online service for lending file storage areas of the respective contents servers 100 and 110 to a user. The online service includes "Evernote (registered trademark of Evernote Corporation)", "Google (registered trademark of Google, Inc.) Docs", "PICASA (registered trademark of Google, Inc.), "FACEBOOK (registered trademark of Facebook, Inc.)", etc. A user of the online service can upload or download various types of data to or from a storage area assigned to the user via the Internet 6. In the present embodiment, a case that the contents server 100 provides the service A and the contents server 110 provides the service B will be described as an example. The contents server 100 comprises a data storage area 101. The data storage area 101 is an area in which various data is stored.

(Role of Mediation Server 60)

A business operator providing the contents server discloses a dedicated API (referred to as Application Program Interface) for requiring a reply of a folder name of a folder stored in the contents server or a file name of image data stored in the contents server. When the multi-function peripheral supports an API of the contents server, the multi-function peripheral can require a reply of information of the contents server. When specification of the API is changed, it becomes necessary to update software of the multi-function peripheral to support the changed API. However, it is painful for the user to update the software of the multi-function peripheral that is already operating. Accordingly, in the embodiment, the mediation server 60 is provided in order that the multi-function peripheral 10 can upload data to the contents server even when the multi-function peripheral 10 does not support the API of the contents server. That is, the mediation server 60 supports the API for requiring a reply of a folder name of a folder stored in the contents server or a file name of image data stored in the contents server. Furthermore, there is a case in that a plurality of contents servers of different types is connected to the Internet. Furthermore, the business operator providing each contents server discloses a dedicated API (referred to as Application Program Interface) to upload data to the contents server. It is necessary for the multi-function peripheral 10 to support APIs of a plurality of contents servers in order to upload data to the respective contents servers, so that it is necessary to store a number of programs. However, storage capacity of a memory of the multi-function peripheral 10 is small as compared with a PC, etc.

Figure 2:
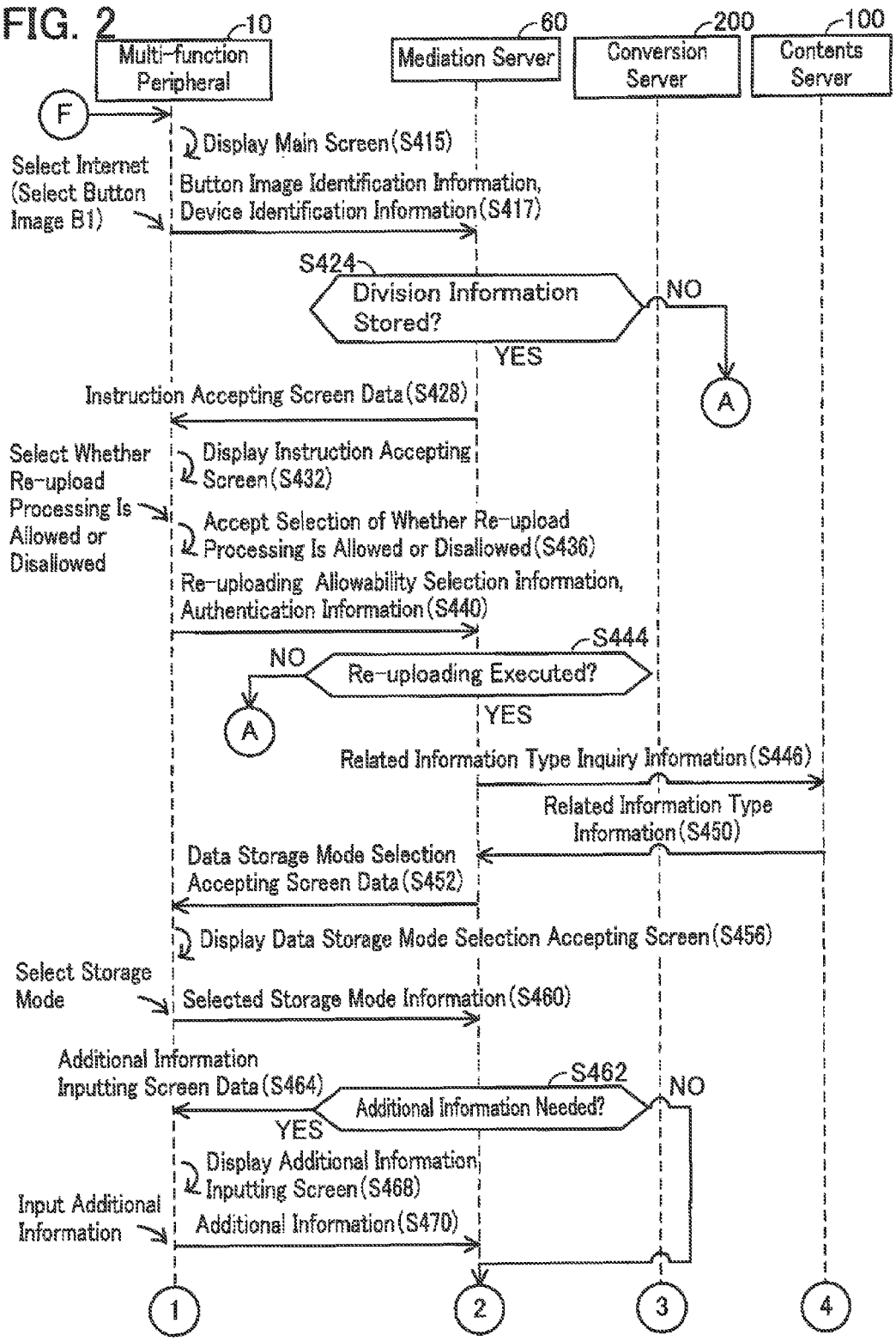
FIG. 2 shows a sequence diagram of various processing executed by each device.
Figure 3:
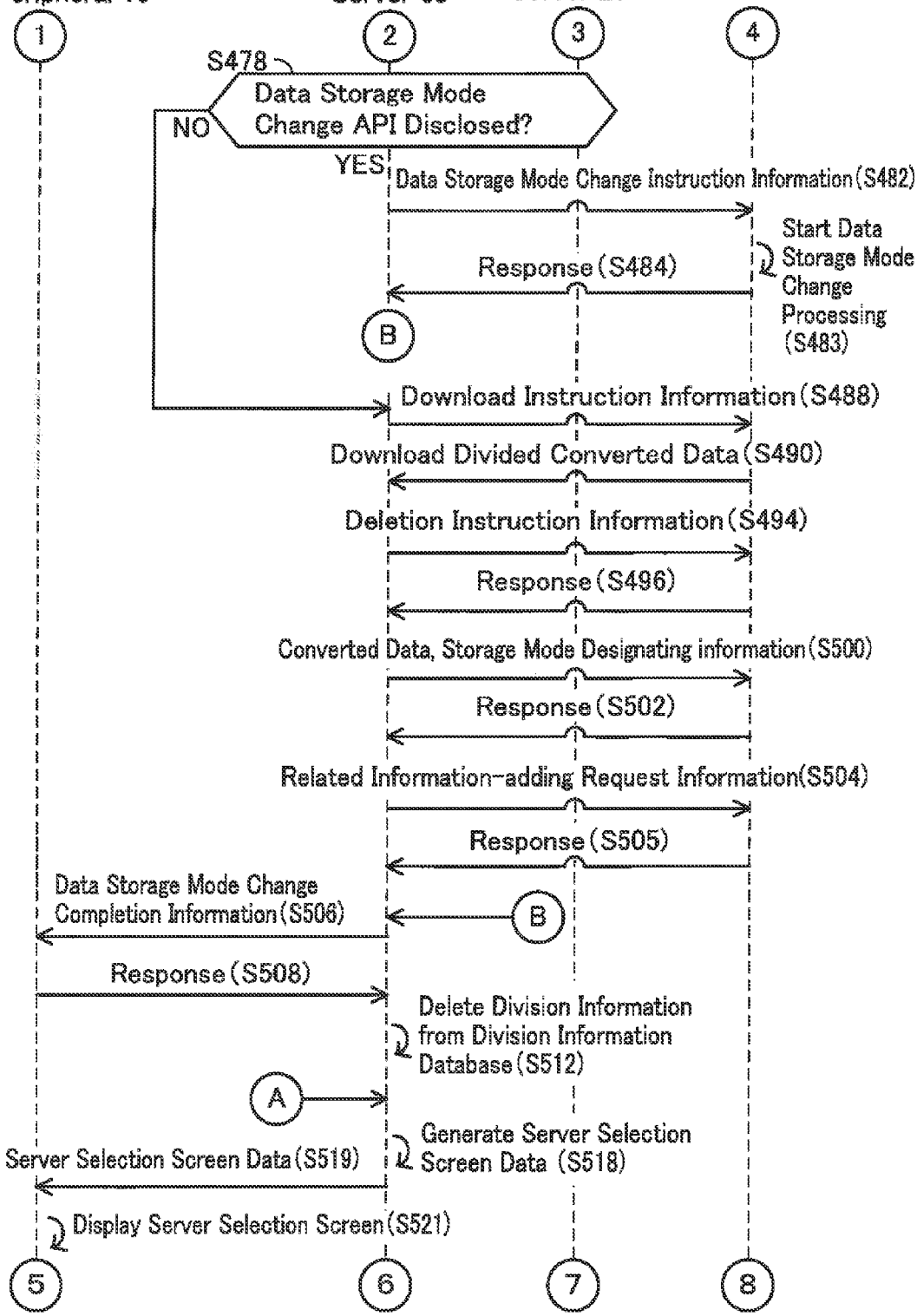
FIG. 3 shows a sequence diagram of various processing executed by each device.

Accordingly, in the embodiment, the mediation server 60 is provided so that the multi-function peripheral 10 can upload data to each of the plurality of contents servers without storing a number of programs in the multi-function peripheral 10. That is, the mediation server 60 supports a plurality of APIs for the plurality of respective contents servers. For example, the mediation server 60 may obtain the plurality of respective APIs of the plurality of contents servers from the respective contents servers and store the APIs in the memory 74. Then, in a state where the multi-function peripheral 10 uploads data to a specific contents server (for example, the contents server 100) among the plurality of contents servers, the mediation server 60 uses an API for the specific contents server to perform various communications to be described below (for example, communication in S446 illustrated in FIG. 2 and communication in S482, S484, and S488 to S505 illustrated in FIG. 3) with the specific contents server. Herewith, the multi-function peripheral 10 can upload data to the specific contents server even when the multi-function peripheral 10 does not support the API for the specific contents server.

(Operation of Communication System)

Figure 10:
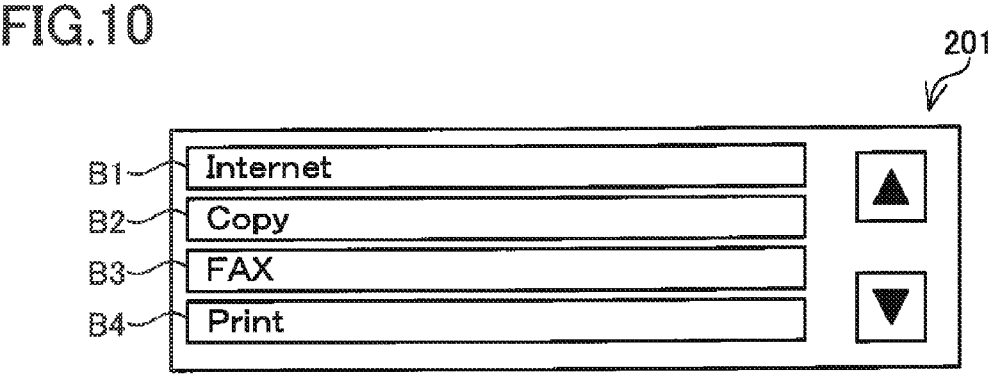
FIG. 10 shows an example of a main screen display.

Operation of the communication system 2 will be described using sequence diagrams of FIGS. 2 to 8. In an initial state of the communication system 2, the respective CPUs of the multi-function peripheral 10, the mediation server 60, the conversion server 200, and the contents server 100 are operating in accordance with programs stored in the respective devices. This makes it possible to handle input to an operating unit or to a network I/F. When receiving an order for displaying a main screen, the CPU 22 of the multi-function peripheral 10 cause the display unit 14 to display the main screen in S415 in FIG. 2. The order for displaying the main screen may be input from the operating unit 12 by a user. Data for displaying the main screen may be preliminarily stored in the memory 24. An example of the main screen 201 is shown in FIG. 10. The main screen 201 includes button images B1 to B4. The button images B1 to B4 are images for receiving an input of an execution order among a plurality of functions. The functions accepted by the button images B1 to B4 are an Internet function, a Copy function, a FAX function, and a Print function, respectively.

In the description example of the present embodiment, a case of uploading various types of data to the contents server 100 will be described. In this case, the button image B1 included in the main screen 201 is selected. In S417, the CPU 22 of the multi-function peripheral 10 transmits, to the mediation server 60, button image identification information to identify the button image B1 thus selected and device identification information to identify the multi-function peripheral 10. It should be noted that the button image identification information may function as access start information indicating that the multi-function peripheral 10 starts access to the contents server 100 or 110. An example of the button image identification information is "Internet", which is the name of the button image B1. An example of the device identification information is the MAC address of the multi-function peripheral 10.

In S424, the CPU 72 determines whether or not division information corresponding to the multi-function peripheral 10 is stored in the division information database 76. Specifically, the CPU 72 finds whether or not information that matches the device identification information obtained in S417 is stored in the division information database 76. If the determination is negative (S424: NO), the CPU 72 proceeds to S518, and when the determination is positive (S424: YES), the CPU 72 proceeds to S428.

Figure 11:
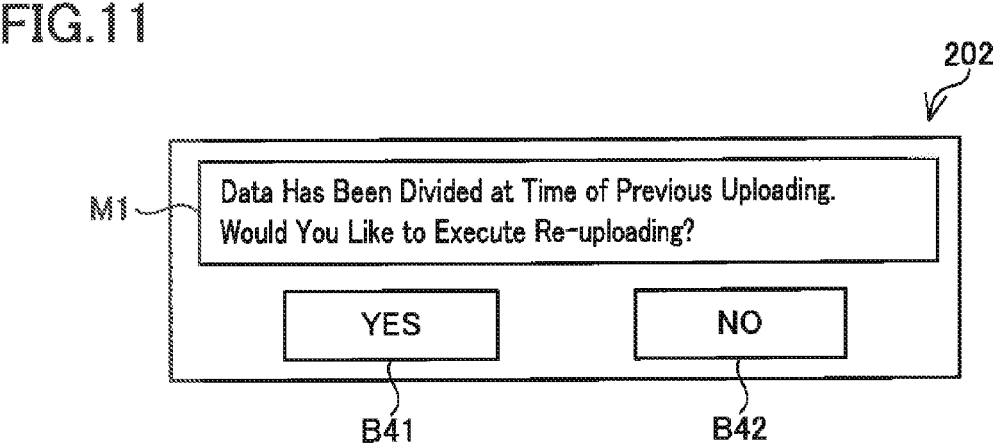
FIG. 11 shows an example of an instruction accepting screen display.

In S428, the CPU 72 transmits instruction accepting screen data to the multi-function peripheral 10. The instruction accepting screen data is data for causing the display unit 14 of the multi-function peripheral 10 to display an instruction accepting screen. In S432, the CPU 22, when receiving the instruction accepting screen data, causes the display unit 14 to display an instruction accepting screen 202. As shown in FIG. 11, the instruction accepting screen 202 contains a message image M1 and button images B41 and B42. The message image M1 is an image for notifying the user that data division processing was executed at the time of execution of the previous uploading.

The button images B41 and B42 are each an image for accepting selection of whether re-upload processing is allowed or disallowed to be carried out. Re-upload processing is processing in which converted data or upload data divided into a plurality of groups and stored in the first storage mode in the contents server 100 or 110 are uploaded again in the second storage mode that the user desires.

In S436, the CPU 22 accepts selection of whether re-upload processing is allowed or disallowed to be carried out. Specifically, the CPU 22 accepts touch input to the button image B41 or B42. Upon accepting the touch input, the CPU 22 proceeds to S440. In S440, the CPU 22 transmits re-uploading allowability selection information and authentication information to the mediation server 60. "Re-uploading allowability selection information" is information indicating whether re-upload processing is allowed or disallowed to be executed. Authentication information is information to obtain access authentication for the contents server 100. An example of authentication information is an access token. When receiving the authentication information, the CPU 72 of the mediation server 60 causes the authentication information thus received to be temporarily stored in the memory 74. From this point onward, the CPU 72 performs communication with the contents server 100 by obtaining access authentication for the contents server 100 with use of the authentication information. Further, in response to completion of a series of communications with the contents server 100, the CPU 72 erases the authentication information stored in the memory 74. For example, the CPU 72 may erase the authentication information in response to entering into the stage of execution of the processing of S512. This makes it possible to ensure security.

In S444, the CPU 72 determines whether or not the re-uploading allowability selection information thus received gives an instruction to execute re-upload processing. If the determination is negative (S444: NO), the CPU 72 proceeds to S518. In this case, since the processing of S512 described later is skipped, the division information found in S424 is not deleted from the division information database 76. Therefore, for example, the division information may be deleted from the division information database 76 when a predetermined period of time (e.g. one week) has elapsed since the division information was stored in the division information database 76 (S676). Alternatively, when the determination in S444 is positive (S444: YES), the CPU 72 proceeds to S446.

In S446, the CPU 72 transmits related information type inquiry information to the contents server 100. "Related information type inquiry information" is information to inquire the contents server 100 for related information type information. In S450, the CPU 72 receives related information type information from the contents server 100. "Related information type information" is information indicating related information that the contents server 100 can use.

In S452, the CPU 72 generates data storage mode selection accepting screen data and transmits it to the multi-function peripheral 10. In S456, the CPU 22, when receiving the data storage mode selection accepting screen data, causes the display unit 14 to display a data storage mode selection accepting screen 203.

Figure 12:
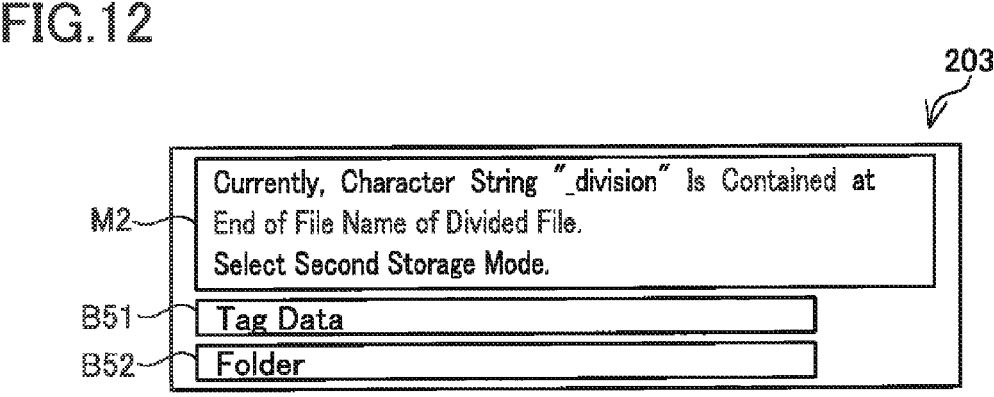
FIG. 12 shows an example of a data storage mode selection accepting screen display.

As shown in FIG. 12, the data storage mode selection accepting screen 203 contains a message image M2 and button images B51 and B52. The message image M2 is an image for notifying the user of the content of the first storage mode determined by the mediation server 60 at the time of execution of the previous uploading. Further, the message image M2 is an image for causing the user to perform an operation of selecting a second storage mode. The second storage mode is a storage mode for associating divided pieces of data with each other. Further, the second storage mode is a storage mode that is determined by the user. The second storage mode may be a storage mode that is identical to or different from the first storage mode of which use was instructed by the mediation server 60. The data storage mode selection accepting screen shows button images regarding second storage modes that can be used on the contents server 100. A second storage mode that can be used on the contents server 100 is specified on the basis of the related information type information received in S450. That is, related information that the contents server 100 can use is extracted on the basis of the related information type information. Then, a second storage mode that can be achieved with use of the related information thus extracted is specified as the second storage mode that can be used on the contents server 100. The button image B51 is an image for accepting an instruction to use the tag data use mode as the second storage mode. The button image B52 is an image for accepting an instruction to use the folder use mode as the second storage mode.

The user operates the operating unit 12 to select, from the data storage mode selection accepting screen 203, a button image displaying the storage mode that the user wishes to use at the time of re-uploading. The present embodiment is described by taking, as an example, a case that the tag data use mode is used as the second storage mode. In this case, the image button B51 contained in the data storage mode selection accepting screen 203 is selected. In S460, the CPU 22 transmits selected storage mode information to the mediation server 60. "Selected storage mode information" is information indicating a second storage mode that the user selected.

In S462, the CPU 72 determines whether or not additional information is necessary. Additional information is information that is additionally needed in executing re-upload processing with use of the second storage mode. Further, the determination in S462 may be made depending on whether or not the storage mode selected by the user in S456 is a storage mode that needs additional information. For example, in a case that the file name use mode or the tag data use mode has been selected as the second storage mode, it may be determined that information indicating a file name or a tag name is needed as additional information. Further, for example, in a case that the folder use mode or the note use mode has been selected as the second storage mode, it may be determined that information indicating a folder name or a note name is needed as additional information. If the determination is negative (S462: NO), the CPU 72 proceeds to S478, and when the determination is positive (S462: YES), the CPU 72 proceeds to S464.

Figure 13:
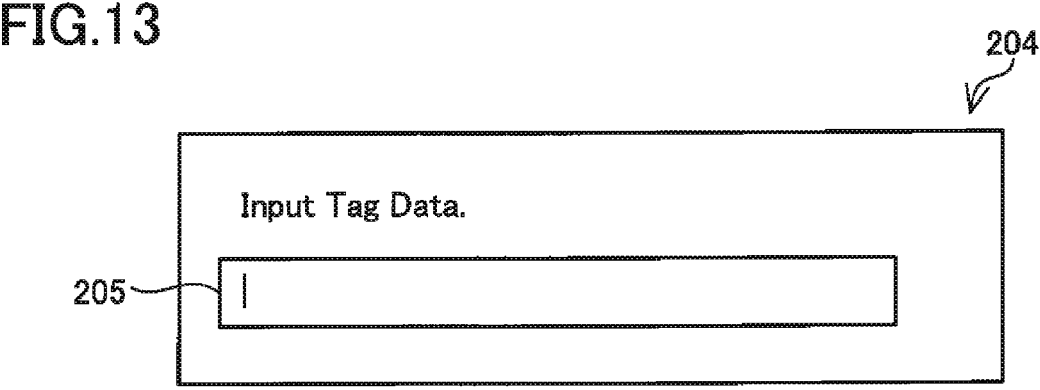
FIG. 13 shows an example of an additional information inputting screen display.

In S464, the CPU 72 transmits additional information inputting screen data to the multi-function peripheral 10. In S468, the CPU 22, when receiving the additional information inputting screen data, causes the display unit 14 to display an additional information inputting screen 204. As shown in FIG. 13, the additional information inputting screen 204 contains a tag data input field 205. The tag data input field 205 is an image for accepting an input of tag data by the user.

In S470, the CPU 22 of the multi-function peripheral 10 transmits, to the mediation server 60, the additional information inputted by the user. In the example described in the present embodiment, the additional information contains the tag data inputted in step 468.

In S478, the CPU 72 determines whether or not the divided upload service discloses a data storage mode change API. The data storage mode change API is an API for causing the divided upload service to execute data storage mode change processing. "Data storage mode change processing" is processing in which the storage mode of the converted data or upload data divided into the plurality of groups is changed from the first storage mode to the second storage mode, while the converted data or upload data divided into the plurality of groups is maintained as stored in the divided upload service. This determination may be made, for example, by finding whether or not the data storage mode change API for use in the divided upload service is stored in the memory 74 of the mediation server 60. If the determination is positive (S478: YES), the CPU 72 proceeds to S482.

In S482, the CPU 72 transmits data storage mode change instruction information to the contents server 100 with use of the data storage mode change API. "Data storage mode change instruction information" is information that instructs the contents server 100 to execute the data storage mode change processing. In S483, the contents server 100 starts the data storage mode change processing. The data storage mode change processing includes, for example, name change processing, data move processing, and storage mode change processing. Name change processing is processing in which the file name, the tag data, the folder name, the note name, or the like determined by the mediation server 60 is changed to the name that the user desires. Data move processing is processing in which converted data or upload data having been divided into a plurality of groups and stored in a folder or a note created by the mediation server 60 is moved to the folder or the note that the user desires. Storage mode change processing is processing for changing a method for associating pieces of converted data or upload data having been divided into a plurality of groups with each other, from the method determined by the mediation server 60 to the method that the user desires. An example is a case of change from the mode of adding a common character string to each of the file names of pieces of converted data or upload data divided into a plurality of groups to the mode of storing all pieces of converted data or upload data divided into a plurality of groups in a single folder. Further, two or more of the name change processing, the data move processing, and the storage mode change processing may be combined.

In S484, the CPU 72 receives response information to data update instruction information from the contents server 100. Then, the CPU 72 proceeds to S506.

On the other hand, when the determination in S478 is negative (S478: NO), the CPU 72 proceeds to S488. In S488 to S502, the CPU 72 of the mediation server 60 executes re-upload processing. In the re-upload processing, the converted data or upload data divided into the plurality of groups and stored in the first storage mode in the divided upload service is downloaded from the divided upload service to the mediation server 60. Then, processing is performed in which the converted data or upload data thus downloaded is uploaded again to the divided upload service in the second storage mode.

In S488, the CPU 72 transmits download instruction information to the contents server 100. "Download instruction information" is information that instructs the contents server 100 to transmit the converted data or upload data divided into the plurality of groups to the mediation server 60. In S490, the CPU 72 downloads, from the contents server 100, the converted data or upload data divided into the plurality of groups. In S494, the CPU 72 transmits deletion instruction information to the contents server 100. "Deletion instruction information" is information that instructs the contents server 100 to delete the converted data or upload data divided into the plurality of groups, which was downloaded in S490. In S496, the CPU 72 receives, from the contents server 100, a response indicating that the converted data or upload data divided into the plurality of groups has been deleted.

In S500, the CPU 72 transmits the downloaded converted data or upload data and storage mode designating information to the contents server 100. "Storage mode designating information" is information to instruct the contents server 100 to store the converted data or the upload data in the second storage mode in the content servers 100. Specifically, the storage mode designating information is information indicating a folder name or a note name. In S502, the CPU 72 receives, from the contents server 100, a response indicating that the converted data or the upload data has been saved in the second storage mode. In S504, the CPU 72 transmits related information-adding request information to the contents server 100. "Related information-adding request information" is information to instruct the contents server 100 to add related information in the second storage mode to the uploaded converted data or the upload data. Related information is information to associate the divided pieces of converted data with each other. For example, in a case that the second storage mode is the file name use mode or the tag data use mode, the related information-adding request information instructs the contents server 100 to add a file name or tag data including the same character string to each of M pieces of converted data. In S505, the CPU 72 receives, from the contents server 100, a response indicating that the processing of adding the related information has been completed.

In S506, the CPU 72 transmits, to the multi-function peripheral 10, "data storage mode change completion information" indicating that the data storage mode change processing has been completed. In S508, the CPU 72 receives a response to the data storage mode change completion information from multi-function peripheral 10. In S512, the CPU 72 deletes the division information found in S424 from the division information database 76.

In S518, the CPU 72 of the mediation server 60 generates server selection screen data for displaying the server selection screen 211. Information (not illustrated) indicating which information needs to be included in the server selection screen data is stored in the memory 74. The CPU 72 of the mediation server 60 generates the server selection screen data according to this information. The server selection screen data includes information indicating that button images B11 and B12 are to be included in the server selection screen 211, information indicating that a screen for selecting any one of the button images B11 and B12 is to be displayed, information indicating that server names "Server 100" and "Service 110" correspond to the button images B11 and B12, respectively, and information indicating character strings to be displayed in association with the button images B11 and B12. In S519, the CPU 72 of the mediation server 60 transmits the server selection screen data to the multi-function peripheral 10.

Figure 14:
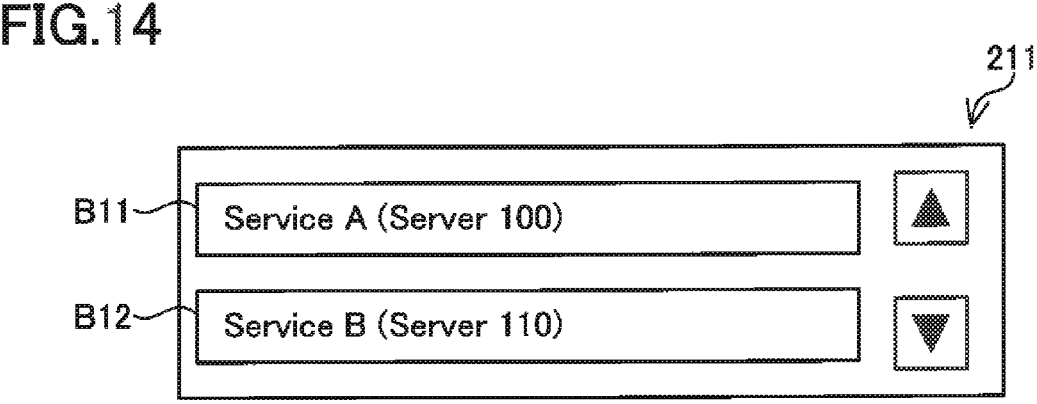
FIG. 14 shows an example of a server selection screen display.

When receiving the server selection screen data from the mediation server 60, the CPU 22 of the multi-function peripheral 10 displays the server selection screen 211 on the display unit 14 in S521. As illustrated in FIG. 14, the server selection screen 211 includes the button images B11 and B12. The button images B11 and B12 are images for accepting selection of the contents servers 100 and 110, respectively. The CPU 22 of the multi-function peripheral 10 creates bitmap information or the like for displaying the images of the button images B11 and B12 based on the server selection screen data received from the mediation server 60 and displays the server selection screen 211 on the display unit 14. The user operates the operating unit 12 to select a button image that represents the contents server, from which image data is to be downloaded, on the server selection screen 211. In the present embodiment, a case that the user selects the button image B11 (that is, the contents server 100) will be described as an example.

In S529, the CPU 22 of the multi-function peripheral 10 transmits, to the mediation server 60, server identification information corresponding to the button image that the user selected and the authentication information. In the example described in the present embodiment, server identification information containing the server name "Server 100" is transmitted to the mediation server 60. The content of authentication information has already been described in S440, and as such, is not described here. Further, the authentication information stored in the memory 74 may be erased, for example, at the stage of execution of the processing of S677.

In S531, the CPU 72 of the mediation server 60 transmits to the contents server 100 storable data type information request information, to request that storable data type information be transmitted to the mediation server 60. "Storable data type information" is information indicating the types of data formats which can be stored in the contents server 100. One example of storable data type information is an extension indicating a data format. The contents server 100, when receiving storable data type information request information from the mediation server 60, transmits storable data type information to the mediation server 60. In S533, the CPU 72 receives the storable data type information.

In S534, the CPU 72 of the mediation server 60 generates data format selection screen data for display of a data format selection screen 221 based on the storable data type information received in S533. The data format selection screen is a screen to cause the user to select a data format when uploading data to a selected contents server. The data format selection screen may also display a list of data formats which can be stored in the selected contents server, and accept selection by the user of a data format from the list. In S535, the CPU 72 transmits the data format selection screen data to the multi-function peripheral 10.

Figure 15:
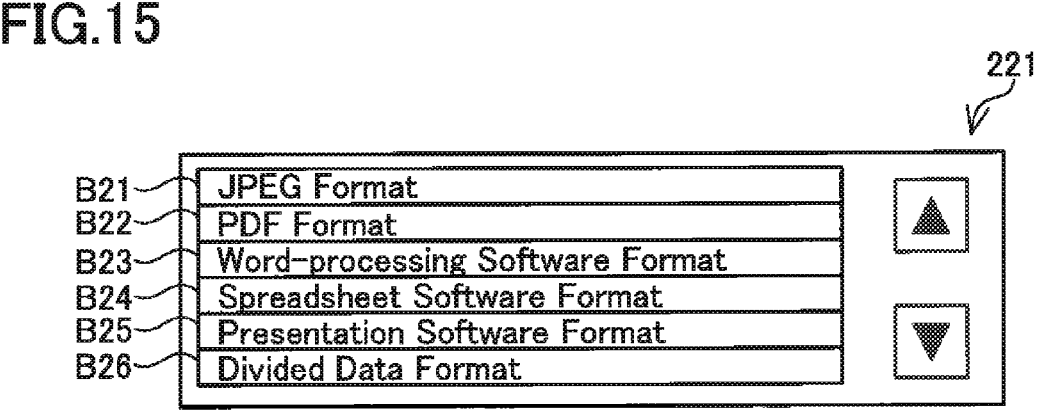
FIG. 15 shows an example of a data selection screen display.

In S537 the CPU 22 of the multi-function peripheral 10, when receiving the data format selection screen data from the mediation server 60, causes the display unit 14 to display the data format selection screen 221. Then, the CPU 22 accepts the processing of selecting a selected data format, which is a data format in which the converted data or the upload data is uploaded to the contents server 100. As shown in FIG. 15, the data format selection screen 221 contains button images B21 to B26 for accepting selection of a selected data format. The user operates the operating unit 12 to select, from the data format selection screen 221, a button image displaying the data format in which the user desires to upload the data.

The button image B21 is an image for selecting a JPEG (referred to as Joint Photographic Experts Group) format. The button image B22 is an image for selecting a PDF (Portable Document Format) format. Further, in a case that a PDF format is selected, an "N in 1" layout can be employed. The N in 1 layout is a layout in which each of N pages of converted data or upload data is scaled down and equally laid out in one page. The button image B23 is an image for selecting a word-processing software format. The button image B24 is an image for selecting a spreadsheet software format. The button image B25 is an image for selecting a presentation software format. The button image B26 is an image for selecting a divided data format. A divided data format is a format in which N images contained in one page of upload data are divided into N pieces of converted data. Examples of utilization of a divided data format include a case that address data is created. For example, when a sheet of copy paper has N address entry columns on it and the user writes an address in each of the N columns and then scans the sheet of copy paper, N pieces of converted data may be generated.

In a case that a JPEG format has been selected as the selected data format, it is not necessary to execute the conversion processing (described later) in uploading upload data in a JPEG format to the contents server 100. Meanwhile, in a case that a PDF format, a word-processing software format, a spreadsheet software format, a presentation software format, or a divided data format has been selected as a selected data format, it is necessary to first convert upload data in a JPEG format into converted data through the conversion processing (described later) and then upload the converted data to the contents server 100.

In S541, the CPU 22 of the multi-function peripheral 10 transmits selected data format instruction information corresponding to the button image selected by the user to the mediation server 60. "Selected data format instruction information" is information to identify the selected data format. Further, "selected data format instruction information" is also information to identify processing that is executed on upload data. The selected data format instruction information may be described using a URL (referred to as Uniform Resource Locator) description method. In S543, the CPU 72 of the mediation server 60 generates scan setting screen data to display a scan setting screen based on the selected data format instruction information. A scan setting screen is a screen to accept input of various scan settings (for example, the format of data to be generated, resolution, color mode, and similar). Further, a scan setting screen is also a screen to accept input of a file name that is given to upload data and of a folder name of a folder in which upload data is stored.

In S545, the CPU 72 of the mediation server 60 transmits the scan setting screen data to the multi-function peripheral 10. In S547 the CPU 22 of the multi-function peripheral 10, when receiving the scan setting screen data from the mediation server 60, causes the display unit 14 to display the scan setting screen. The CPU 22 accepts inputs of various scan settings, file name and folder name by the user via the operating unit 12. Examples of various scan settings are the scan resolution of the upload data generated by scanning and color mode.

In S551, the CPU 22 of the multi-function peripheral 10 transmits scan setting information and name information to the mediation server 60. Scan setting information is for indicating contents of various scan settings that were inputted. Scan setting information may include upload data format instruction information to identify the data format of upload data. An example of upload data format instruction information is an extension. Name information is for indicating file name and folder name which are inputted by the user.

In S552, the CPU 72 of the mediation server 60 determines whether or not it is necessary to perform conversion processing on the upload data. Specifically, in a case that the data format of upload data that is transmitted from the multi-function peripheral 10 and the data format in which the upload data is saved in the contents server 100 are different from each other, the CPU 72 determines that it is necessary to perform conversion processing. This determination may be made by making a comparison between the data format that is identified by the upload data format instruction information contained in the scan setting information received in S551 and the data format that is identified by the selected data format instruction information received in S541. For example, in a case that upload data is in a JPEG format and the data format in which the upload data is saved in the contents server 100 is a word-processing software format, the CPU 72 determines that it is necessary to perform conversion processing. In a case that the CPU 72 determines that it is necessary to perform conversion processing (S552: YES), the CPU 72 proceeds to S553.

In S553, the CPU 72 transmits upload limit information reception request information and related information type inquiry information to the contents server 100. "Upload limit information reception request information" is information to request the contents server 100 for upload limit information.

In S554, the CPU 72 receives upload limit information and related information type information from the contents server 100. Upload limit information is information indicating the content of a limit on uploading of data to the contents server 100. Examples of the content of a limit on uploading include an upload volume limit and an upload data number limit. An upload volume limit and an upload data number limit are each an upper-limit value of the amount of data and the number of pieces of data that the contents server 100 can obtain through a series of upload processing that is performed in accordance with a single upload instruction. The content of related information type information has already been described in S450, and as such, is not described here.

In S556, the CPU 72 determines "L", which is the conversion upper-limit data number. L is a natural number of 2 or greater. The conversion upper-limit data number is the upper-limit number of pieces of upload data that can be converted through a series of conversion processing. The series of conversion processing is conversion processing for generating converted data that is uploaded in a series of save upload processing that is performed in accordance with a single upload instruction. The conversion upper-limit data number may be determined on the basis of the upload limit information received in S554. For example, in a case that the upper-limit data amount serving as an upload volume limit is known, the conversion upper-limit data number may be determined by roughly estimating the volume of converted data that is generated by executing conversion processing on a single piece of upload data and dividing the upper-limit amount of data by the roughly-estimated data volume.

In S558, the CPU 72 transmits, to the contents server 100, "upload identification processing request information" to request the contents server 100 to execute upload identification processing. Upload identification processing is processing in which information to identify the upload data or the converted data in storing the upload data or the converted data in the contents server 100 is stored in the contents server 100 in association with the upload data or the converted data. Examples of upload identification processing include: a mode in which the file name inputted in S551 is added to upload data or converted data; and a mode in which upload data or converted data is stored in a folder having the folder name inputted in S551. In S559, the CPU 72 receives a response to the upload identification processing request information from the contents server 100.

The CPU 72 proceeds to S561, and conversion processing order processing P1, wait command processing P2, and first upload processing P3 are executed.

The "conversion processing order processing P1" (S561 to S621) is processing to cause upload data to be conversion-uploaded from the multi-function peripheral 10 to the conversion server 200. It is also processing in which a command to execute conversion processing is applied to upload data uploaded to the conversion server 200.

Details of the conversion processing order processing P1 are explained below. In S561, the CPU 72 of the mediation server 60 generates scan upload execution order information. "Scan upload execution order information" is information to order the multi-function peripheral 10 to upload the upload data generated by the scan processing. In S563, the CPU 72 transmits the scan upload execution order information to the multi-function peripheral 10. In S565, the CPU 22 of the multi-function peripheral 10 executes scanning of an image. A specific example is described. When the user places, on the scan executing unit 19, a single document having J pages (where J is a natural number of 1 or greater) on which predetermined images have been recorded and depresses a read start button of the operating unit 12, the CPU 22 causes the scan executing unit 19 to read the pages 1 to J of the document. Then, the CPU 22 generates J pieces of upload data, which constitute a single data aggregate generated from the single document. The data format of the J pieces of upload data may be a JPEG format. It should be noted that the scan executing unit 19 performs a scan of the images on the basis of the scan settings inputted in S547.

In S571, the CPU 22 transmits conversion upload destination URL reception request information and template reception request information to the mediation server 60. "Conversion upload destination URL reception request information" is information to request a conversion upload destination URL, which is information necessary to perform uploading to the conversion server 200. "Template reception request information" is information to request a template for an upload message, described below. In S573, the CPU 72 of the mediation server 60 transmits conversion upload data ID reception request information to the conversion server 200. "Conversion upload data ID reception request information" is information to request a conversion upload data ID to the conversion server 200. The conversion upload data ID is a data ID for identifying upload data uploaded to the conversion server 200. In S575, the CPU 272 of the conversion server 200 transmits the conversion upload data ID to the mediation server 60.

In S577, the CPU 72 creates a template for an upload message. A template for an upload message is a template for a message when uploading upload data to the conversion server 200.

In S579, the CPU 72 transmits the conversion upload destination URL and the template for the upload message to the multi-function peripheral 10. An example of the conversion upload destination URL is the URL of the conversion server 200.

In S581, the CPU 22 creates the upload message based on the received template, the received conversion upload destination URL, and the J pieces of upload data created in S565. Specifically, the multi-function peripheral 10 stores binary data as the J pieces of upload data, the conversion upload destination URL, the data size of the J pieces of upload data, and various other information at prescribed positions in the template received from the mediation server 60. Due to this, an upload message suitable for the conversion server 200 can be created.

In S583, the CPU 22 transmits the upload message to the conversion server 200. Due to this, all of the J pieces of upload data are conversion-uploaded to the conversion server 200. In S585, the CPU 272 of the conversion server 200 transmits conversion upload result information to the multi-function peripheral 10. "Conversion upload result information" is information indicating whether the upload data was normally conversion-uploaded to the conversion server 200. In S587, the CPU 22 of the multi-function peripheral 10 transmits the conversion upload result information to the mediation server 60.

In S589, the CPU 72 of the mediation server 60 decodes the conversion upload result information and creates a decoding result. "Conversion upload result information" is information transmitted from the conversion server 200 to the multi-function peripheral 10, and thus has specifications particular to the conversion server 200. Hence by using a decoding program, not shown, included in the program 75 stored in the mediation server 60, the conversion upload result information can be decoded. A decoding result is a message in a format interpretable by the multi-function peripheral 10. The decoding result includes the conversion upload result included in the decoded conversion upload result information.

In S591, the CPU 72 determines whether or not "J", which is the number of pieces of upload data, is greater than "L", which is the conversion upper-limit data number determined in S556. If the determination is positive (S591: YES), the CPU 72 determines that it is highly possible that generation of J pieces of converted data through conversion of the J pieces of upload data may conflict with the upload limit. Then, the CPU 72 proceeds to S595. In S595, the CPU 72 executes data division processing. The data division processing is processing in which K pieces of conversion target data on which this round of conversion processing is to be executed are selected from the pieces of upload data that remain after the pieces of already-converted data have been excluded from the J pieces of upload data (see S651). The value of K is a natural number of 1 or greater to L or less. The data division processing may, for example, be such that K pieces of upload data are selected in ascending order of page number from among plural pieces of upload data on which conversion processing has not been executed yet. The data division processing allows a single group to be divided and generated from a single data aggregate including plural pieces of upload data. Then, the CPU 72 proceeds to S619.

On the other hand, when the determination in S591 is negative (S591: NO), the CPU 72 proceeds to S593. In S593, the CPU 72 selects all of the J pieces of upload data as K pieces of conversion target data. In this case, the value of K is equal to the value of J. That is, when the determination in S591 is negative, the data division processing is not performed. Then, the CPU 72 proceeds to S619.

In S619, the CPU 72 transmits data conversion request information to the conversion server 200. "Data conversion request information" is information to request the conversion server 200 to execute conversion processing on the pieces of conversion target data as a target of conversion in S593 or S595. In S621, the CPU 272 of the conversion server 200 transmits converted data reception information to the mediation server 60. Converted data reception information may include a conversion job ID. The conversion job ID is information to identify conversion processing performed according to the processing to request execution of conversion processing (S619).

Wait command processing P2 (S631 to S651) is processing to cause the multi-function peripheral 10 to wait until the completion of conversion processing, once the conversion processing has been started for the upload data. The conversion server 200 executes the conversion processing of the K pieces of upload data in response to the reception of the data conversion request information in S619.

In S631, the CPU 72 of the mediation server 60 transmits conversion completion conformation request information, converted data number request information, and converted data volume request information to the conversion server 200. "Conversion completion conformation request information" is information to confirm with the conversion server 200 whether or not the conversion processing that the conversion server 200 was requested in S619 to execute has been completed. "Converted data number request information" is information to confirm M (where M is a natural number of 1 or greater) with the conversion server 200. M is the number of pieces of converted data that are generated in response to completion of the conversion processing on the K pieces of upload data. The values of K and M may be equal to each other or may be different from each other. An example of a case that the values of K and M are equal to each other is a case that the processing of changing the format of upload data is executed. An example of a case that M is less than K is a case that upload data is converted into data in a PDF format of the aforementioned N in 1 layout. This is because in the N in 1 layout, one page of converted data is generated from N pages of upload data. An example of a case that M is greater than K is a case that upload data is divided into data in the aforementioned divided data format. This is because in the divided data format, N pieces of converted data are generated from a single piece of upload data. Converted data volume request information is information to, in response to completion of the conversion processing, confirm with the conversion server 200 the total data amount of the M pieces of converted data thus generated.

In S632, the CPU 272 of the conversion server 200 determines whether the conversion processing has completed. Specifically, using the converted data reception information included in the conversion completion confirmation request information, one conversion processing item for determination as to whether the conversion processing has completed is specified. Then, it is determined whether the conversion of the K pieces of upload data in the specified conversion processing has completed. In a case that the conversion processing has not completed (S632: NO), processing proceeds to S633.

In S633, the CPU 272 transmits to the mediation server 60 "incomplete conversion notification information" indicating that conversion processing has not completed. In S635, the CPU 72 of the mediation server 60 generates a wait command in response to the reception of the incomplete conversion notification information.

The wait command is an order to cause the multi-function peripheral 10 to wait for the completion of the conversion processing.

In S637, the CPU 72 transmits the wait command to the multi-function peripheral 10. In S639, the CPU 22 of the multi-function peripheral 10 executes wait processing to wait for the completion of the conversion processing. The wait processing may for example be processing in which a timer which had been started to detect a timeout of the conversion processing is reset and again started. Or, for example, the wait processing may be processing in which, by increasing the timeout time stored in memory 24 such that the time until timeout of conversion processing is extended, whereby the time until timeout of conversion processing is lengthened. The reason for executing the wait processing will be explained. In a case that the period from input of scan settings (S551) until reception of processing completion notification information (S677) exceeds the timeout time, a timeout error occurs. In such a case, a communication error may occur in the network interface 16 of the multi-function peripheral 10, and the reception of the processing completion notification information may be failed. Hence by performing the wait processing, the occurrence of the timeout error is prevented.

In S641, the CPU 22 transmits to the mediation server 60 the wait processing completion information indicating that wait processing execution has completed. Then processing returns to S631.

On the other hand, when the CPU 272 has determined in S632 that the conversion processing has been completed (S632: YES), the CPU 272 proceeds to S643. In S643, the CPU 272 of the conversion server 200 transmits, to the mediation server 60, conversion completion notification information indicating that the conversion processing has been completed for all of the K pieces of upload data, converted data number information indicating the number (i.e. M) of pieces of converted data, and converted data volume information indicating the total data volume of converted data.

In S647, the CPU 72 determines whether or not the converted data conflicts with the upload limit information received in S554. Specifically, the CPU 72 determines whether or not the total data amount of converted data exceeds the upload volume limit and whether or not M, which is the total number of pieces of converted data, exceeds the upload limit data number. If the determination is positive (S647: YES), the CPU 72 proceeds to S649.

In S649, the CPU 72 reduces the value of "K", which indicates the number of pieces of conversion target data. Then, the CPU 72 returns to S595, and redoes the processing of selecting the K pieces of conversion target data after reduction. It should be noted that in a case that the data division processing of S595 has not been executed yet (i.e. in a case that all of the J pieces of upload data are selected as the K pieces of conversion target data), the data division processing is performed by reducing the value of "K" in S649. This allows a single group to be divided and generated from a single data aggregate of converted data.

A first processing example of the processing that is performed in S649 is described. The first processing example is processing that is executed in a case that the respective data amounts of the M pieces of converted data are determined to be approximate to each other. An example of a case that such a determination is made is a case that converted data is data in a PDF (referred to as Portable Document Format) format. In a PDF format, basically, each page is formed by image data. Therefore, the difference in data amount between one page and another is smaller than in the word-processing software format to be described later. In the first processing example, the unit data amount, which is the data amount of converted data per piece of conversion target data, is calculated by dividing the total data amount of the M pieces of converted data by the value of K, which is the total number of pieces of conversion target data. Then, the value of K after reduction is calculated so that a value obtained by multiplying the value of K after reduction by the unit data amount does not exceed the upload volume limit.

A second processing example of the processing that is performed in S649 is described. The second processing example is processing that is executed in a case that the respective data amounts of the M pieces of converted data are determined not to be approximate to each other. An example of a case that such a determination is made is a case that converted data is data in a word-processing software format, data in a spreadsheet software format, or data in a presentation software format. In a word-processing software format or the like, each page is formed by data having various data amounts (e.g. text data, image data, etc.). Therefore, the difference in data amount between one page and another is greater than in the aforementioned PDF format. In the second processing example, the value of K is reduced by dividing "K", which is the number of pieces of conversion target data, into a predetermined number (e.g. two) of groups.

On the other hand, when the determination in S647 is negative (S647: NO), the CPU 72 proceeds to S651. In S651, the CPU 72 excludes, from the target of the conversion processing, the upload data on which the conversion processing was executed. Then, the CPU 72 proceeds to S653.

The first upload processing P3 is explained. The first upload processing P3 (S653 to S679) is processing to upload and save the converted data from the mediation server 60 to the contents server 100. In S653, the CPU 72 of the mediation server 60 transmits converted data reception order information to the conversion server 200. "Converted data reception order information" is an order to cause the conversion server 200 to transmit the converted data, identified by the converted data reception information, to the mediation server 60. In S655, the CPU 272 of the conversion server 200 transmits the converted data, specified by the converted data reception order information, to the mediation server 60.

In S657, the CPU 72 of the mediation server 60 transmits save uploading destination URL reception request information to the contents server 100. "Save uploading destination URL reception request information" is information to request a save uploading destination URL, which is information necessary to perform uploading to the contents server 100. In S659, the CPU 72 receives a save uploading destination URL transmitted from the contents server 100.

In S661, the CPU 72 of the mediation server 60 transmits, to the contents server 100, the M pieces of converted data and storage mode designating information designating storage in the first storage mode.

In S663, the CPU 72 receives save uploading result information transmitted from the contents server 100. "Save uploading result information" is information indicating whether the M pieces of converted data has been stored normally on the contents server 100.

In S666, the CPU 72 transmits related information-adding request information of the first storage mode to the contents server 100. The content of "related information-adding request information" has already been described in S504, and as such, is not described here.

In S668, the CPU 72 receives, from the contents server 100, a response indicating completion of the processing of adding related information. In S670, the CPU 72 determines whether or not the conversion processing has been completed for all of the J pieces of upload data. If the determination is negative (S670: NO), the CPU 72 returns to S591.

In S591, the CPU 72 determines whether or not the number of pieces of upload data on which the conversion processing has not been executed yet is greater than the conversion upper-limit data number "L". If the determination is positive (S591: YES), the CPU 72 proceeds to S595, in which the CPU 72 executes data division processing, whereby another single group is divided and generated from the single data aggregate of upload data. In this way, the processing loop in which a single group is divided from a single data aggregate including J pieces of upload data and conversion processing is executed on the single group thus divided is repeatedly executed until conversion processing and save upload processing are executed on all of the J pieces of upload data.

In S673, the CPU 72 decodes the save upload result information and creates a decoding result. In S675, the CPU 72 determines whether or not data division processing was executed in S595 or S649. If the determination is negative (S675: NO), the CPU 72 proceeds to S677, and when the determination is positive (S675: YES), the CPU 72 proceeds to S676. In S676, the CPU 72 causes each of the device identification information 411 to related information 414 to be stored in the division information database 76. Since the data division processing has thus been executed, the save uploading of data to the contents server 100 in the first storage mode determined by the mediation server 60 is memorized by the mediation server 60.

In S677, the CPU 72 of the mediation server 60 transmits processing completion notification information, division execution notification information, and association notification information to the multi-function peripheral 10. "Processing completion notification information" contains data to cause the display unit 14 of the multi-function peripheral 10 to display the decoding result. "Division execution notification information" is information to notify the multi-function peripheral 10 that the data division processing has been executed. "Association notification information" is information indicating a method for associating divided pieces of data with each other.

Figure 16:
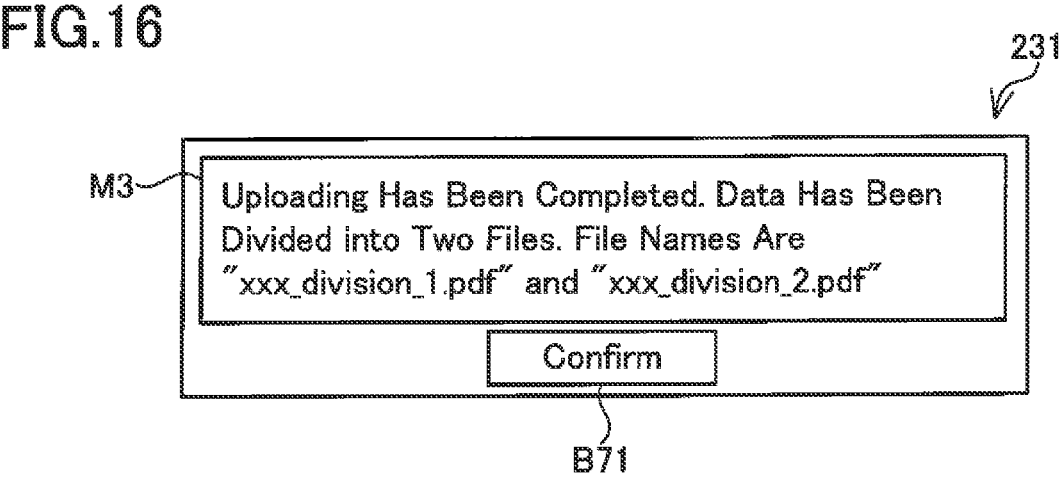
FIG. 16 shows an example of a completion notification screen display.

In S678, the CPU 22 of the multi-function peripheral 10 causes the processing completion notification information, division execution notification information, and association notification information thus received to be stored in the memory 24. In S679, the CPU 22 causes the display unit 14 to display a completion notification screen 231 on the basis of the processing completion notification information, the division execution notification information, and the association notification information. As shown in a screen example of FIG. 16, the completion notification screen 231 contains a message image M3 and a button image B71. The message image M3 is an image, for example, for notifying the user that the data division processing has been executed, and for notifying the user of a method for associating divided pieces of data with each other. The button image B71 is an image for accepting the user's having confirmed the content of the message image M3. Then, the CPU 22 returns to S415 (see FIG. 2), in which the CPU 22 causes the display unit 14 to display the main screen. For example, the CPU 22 may return to S415 with a touch of the button image B71 as a trigger. Further, for example, the CPU 22 may return to S415 in a case that a predetermined period of time (e.g. 10 minutes) has elapsed without a touch on the button image B71 since the completion notification screen 231 was displayed.

Figure 4:
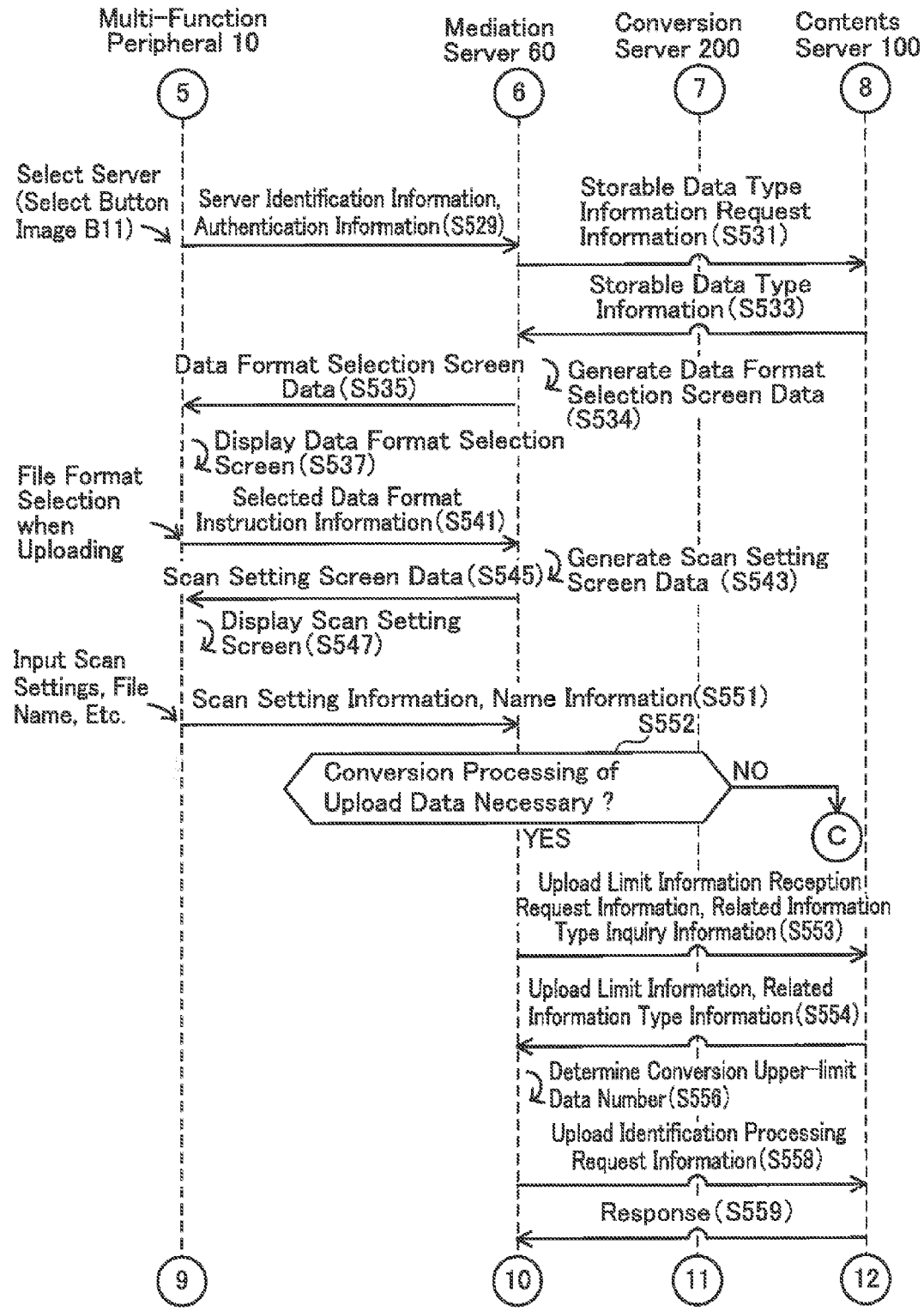
FIG. 4 shows a sequence diagram of various processing executed by each device.
Figure 5:
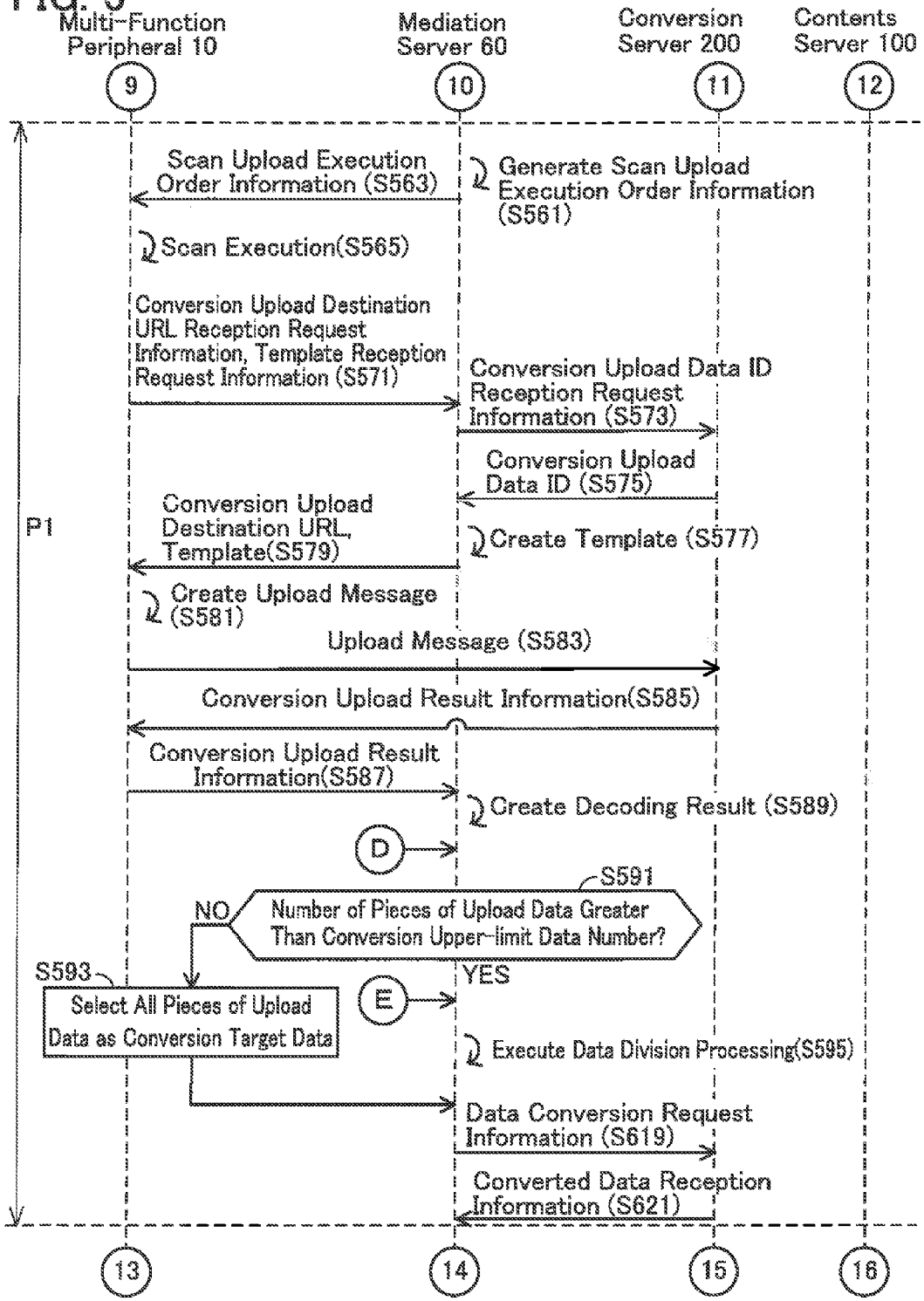
FIG. 5 shows a sequence diagram of various processing executed by each device.
Figure 6:
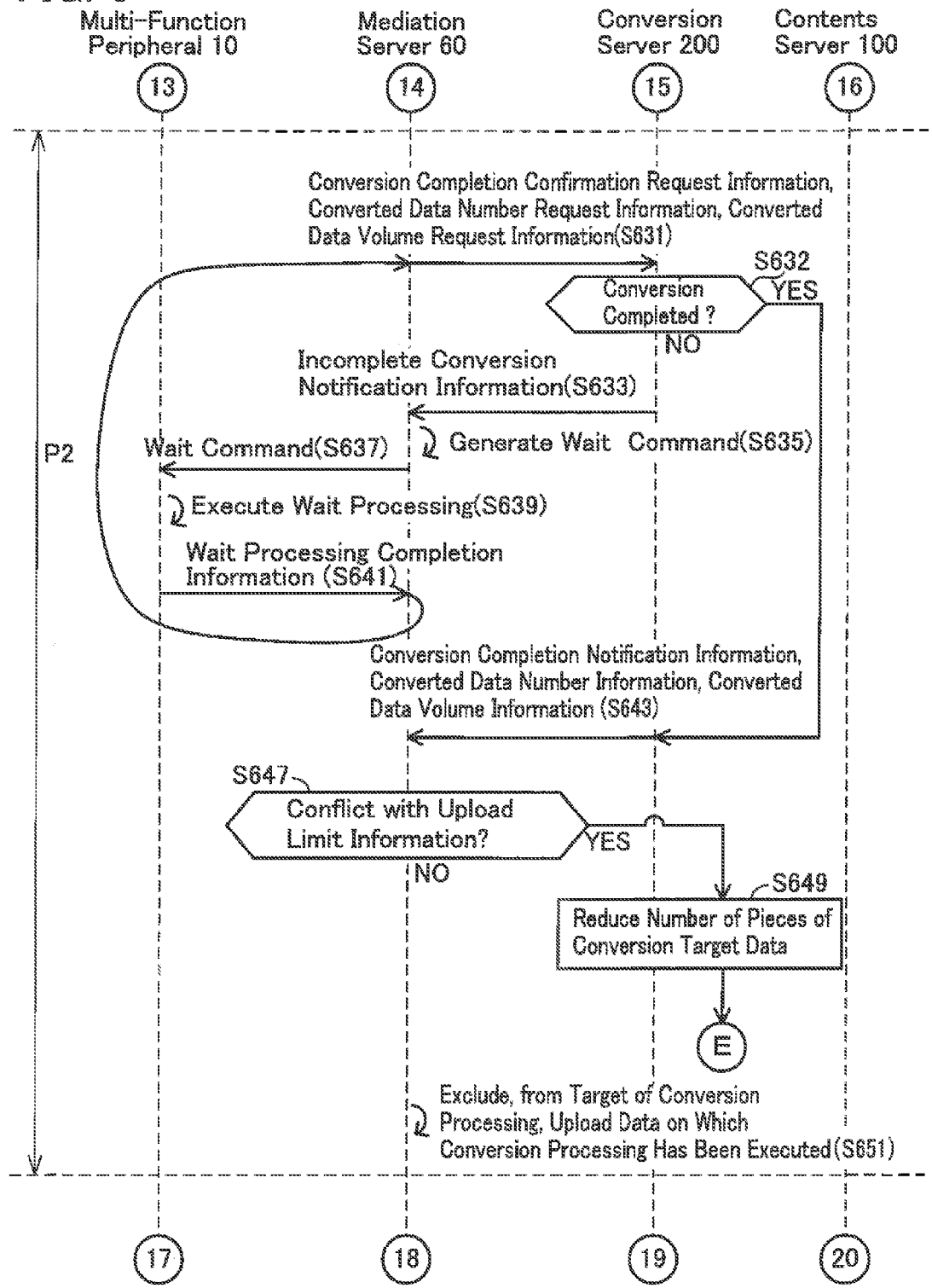
FIG. 6 shows a sequence diagram of various processing executed by each device.
Figure 7:
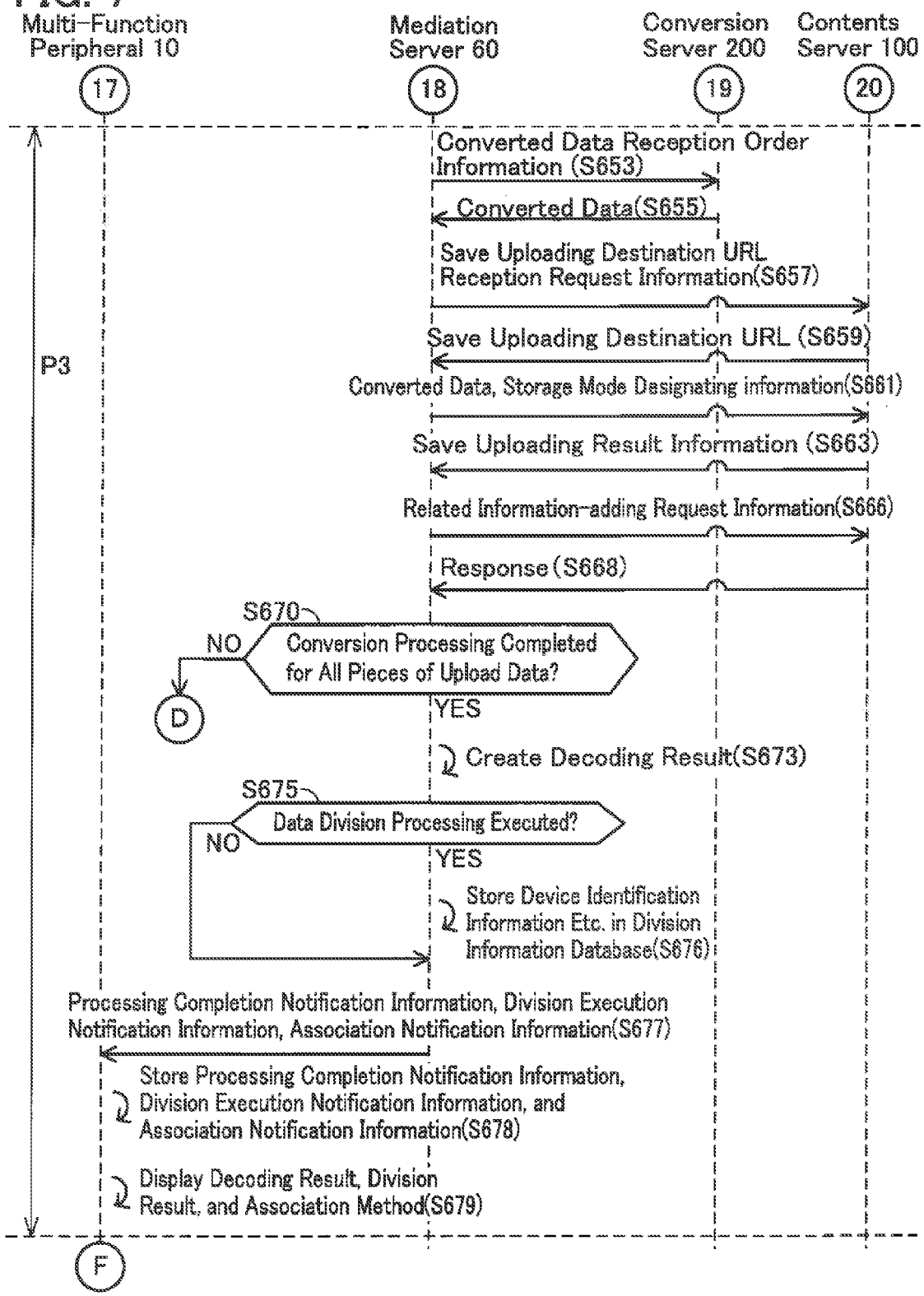
FIG. 7 shows a sequence diagram of various processing executed by each device.

On the other hand, when in S552 in FIG. 4 it is determined that conversion processing of upload data is not necessary (S552: NO), it is determined that the upload data will be uploaded to the contents server 100 without conversion. Hence processing proceeds to S561a in FIG. 8, and second upload processing P3a is executed.

Figure 8:
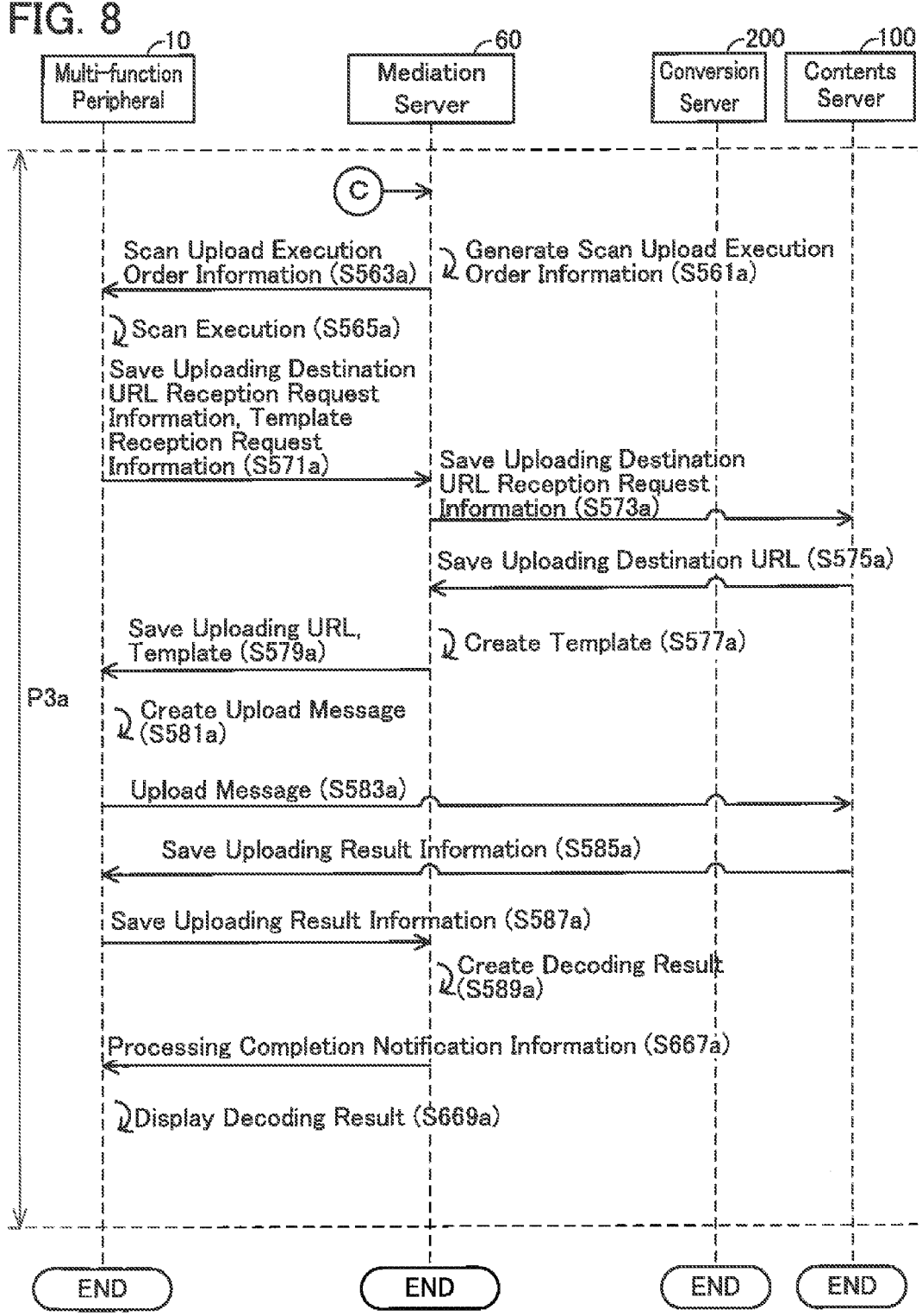
FIG. 8 shows a sequence diagram of various processing executed by each device.

FIG. 8 is used to explain the second upload processing P3a. The second upload processing P3a (S561a to S669a) is processing to upload and save upload data from the multi-function peripheral 10 to the contents server 100.

In S561a, the CPU 72 of the mediation server 60 generates the scan upload execution order information. In S563a, the CPU 72 transmits the scan upload execution order information to the multi-function peripheral 10. In S565a, the CPU 22 of the multi-function peripheral 10 executes the image scanning and creates the upload data. In S571a, the CPU 22 transmits the save uploading destination URL reception request information and the template reception request information to the mediation server 60.

In S573a, the CPU 72 of the mediation server 60 transmits the save uploading destination URL reception request information to the contents server 100. In S575a, the CPU 72 receives the save uploading destination URL transmitted from the contents server 100. In S577a, the CPU 72 creates the template for an upload message. In S579a, the CPU 72 transmits the save uploading destination URL and the template for an upload message to the multi-function peripheral 10. In S581a, the CPU 22 creates the upload message. In S583a, the CPU 22 transmits the upload message to the contents server 100. In S585a, the CPU 22 receives the save uploading result information transmitted from the contents server 100.

In S587a, the CPU 22 of the multi-function peripheral 10 transmits the save uploading result information to the mediation server 60. In S589a, the CPU 72 of the mediation server 60 decodes the save uploading result information and creates a decoding result. In S667a, the CPU 72 transmits the processing completion notification information to the multi-function peripheral 10. In S669*a*, the CPU 22 of the multi-function peripheral 10 causes the display unit 14 to display the decoding result based on the processing completion notification information. Then, the flow of processing is ended.

Effects

The mediation server 60 described herein is configured such that when plural pieces of converted data outputted from the multi-function peripheral 10 need to be divided into a plurality of groups (S591: YES or S647: YES), the pieces of converted data divided into the plurality of groups can be stored in a contents server in the first storage mode determined by the mediation server 60 (S661). An example of the first storage mode is a mode in which a predetermined common character string is added to the end of the file name of each of the pieces of converted data divided into the plurality of groups. Then, after that, in response to the re-access to the mediation server 60 from a particular multi-function peripheral (S417), which is a multi-function peripheral that outputted the upload data on which the pieces of converted data divided into the plurality of groups are based, it is possible to cause the particular multi-function peripheral to display an instruction accepting screen (see FIG. 11) or a data storage mode selection accepting screen (see FIG. 12) (S432, S456). An instruction accepting screen is a screen to accept an instruction to change the storage mode of converted data stored in the contents server from the first storage mode to the second storage mode. A data storage mode selection accepting screen is a screen to accept selection of the second storage mode by the user. This makes it possible to give the user an opportunity to change the storage mode of converted data stored in the contents server. This allows the user to store converted data in the contents server in the storage mode that the user desires.

The mediation server 60 described herein is configured such that data storage mode change instruction information can be transmitted to the contents server with use of a data storage mode change API (S482). This allows the contents server to execute the processing of changing the storage mode of converted data from the first storage mode to the second storage mode.

The mediation server 60 described herein is configured such that converted data stored in the first storage mode in a contents server is downloaded to the mediation server 60 (S488) and the converted data thus downloaded can be re-uploaded in the contents server in the second storage mode (S498, S500). This allows the mediation server 60 to perform the processing of changing the storage mode of converted data in the contents server from the first storage mode to the second storage mode. This makes it possible to change the storage mode of converted data even if there is no data storage mode change API (S478: NO).

The mediation server 60 described herein is configured to be able to execute conversion processing (S631 to S643) on upload data outputted from a multi-function peripheral and then store the upload data in a contents server. This makes it possible to reduce the processing load on the multi-function peripheral in comparison with a case that the multi-function peripheral executes conversion processing. Further, execution of various conversion processing may make it necessary to store converted data in the contents server in the first storage mode that is a storage mode in which the multi-function peripheral did not instruct the mediation server 60 to store the converted data. An example of such a case is a case that converted data conflicts with upload limit information (S647). In such a case, it is possible to display an instruction accepting screen (see FIG. 11) or a data storage mode selection accepting screen (see FIG. 12) on the multi-function peripheral that outputted the upload data on which the converted data is based (S432, S456). This makes it possible to give the user an opportunity to change storage modes.

The mediation server 60 described herein is configured such that an additional information inputting screen (see FIG. 13) to accept input of a file name, tag data, or the like can be displayed on the multi-function peripheral that outputted the upload data on which the converted data is based (S468). Moreover, the storage mode of converted data stored in the contents server can be changed from the first storage mode to the second storage mode, which uses a file name or tag data inputted by the user. This allows the user to add, to converted data, the file name or tag data that the user desires, thus making it possible to improve handleability of converted data.

The mediation server 60 described herein is configured such that a server selection screen (see FIG. 14) to accept selection of a contents server can be displayed on the display unit of a multi-function peripheral in response to the reception of button image identification information indicating that access to a contents server is started (S417). This makes it possible to store converted data in a contents server that the user desires from among a plurality of contents servers.

While specific embodiments of the present invention have been described in detail above, such description is for illustrative purposes only and is not intended to limit the scope and claims of the invention. Techniques described in the claims of the invention include various modifications and changes made to the specific examples illustrated above. Modifications according to the above embodiments are listed below.

First Modification

The present invention is not limited to an embodiment in which in S554, upload limit information and related information type information are received from the contents server 100. For example, upload limit information and related information type information for each of a plurality of contents servers may be stored in advance in the memory 74 of the mediation server 60. Then, when it is determined that conversion processing is necessary (S552: YES), upload limit information and related information type information that correspond to the server identification information received in S529 may be read out from the memory 74. This eliminates the need to ask a content server for upload limit information or the like every time conversion processing is executed, thus making it possible to achieve a reduction in communication data amount and the like.

Second Modification

An embodiment has been described in which when converted data conflicts with upload limit information (S647: YES), conversion processing is executed after dividing the number of pieces of conversion target data on which the converted data is based (S649). However the present invention is not limited to such an embodiment. In S649, the converted data per se may be divided. This makes it possible to save the trouble of re-executing conversion processing.

Third Modification

There may be various types of screens to be displayed on the display unit 14 of the multi-function peripheral 10. For example, in S432, a screen containing both the display content of an instruction accepting screen 202 (see FIG. 11) and the display content of a server selection screen 211 (see FIG. 14) may be displayed. In this case, it is only necessary, in S428, to transmit server selection screen data (see S519) to the multi-function peripheral 10 in addition to instruction accepting screen data. Then, when the button image B41 or B42 (see FIG. 11) has been touched, it may be determined that selection of whether re-upload processing is allowed or disallowed to be carried out has been accepted, and processing may proceed to S440. Further, when the button image B11 or B12 (see FIG. 14) has been touched, it may be determined that selection of a contents server has been accepted, and processing may proceed to S529. This allows a plurality of order inputs to be accepted on a single screen, thus making it possible to enhance operating efficiency.

Fourth Modification

In S415, a screen containing both the display content of a main screen 201 (see FIG. 10) and the display content of an instruction accepting screen 202 (see FIG. 11) may be displayed. In this case, it is only necessary, in S677, to transmit instruction accepting screen data (see S428) to the multi-function peripheral 10 in addition to processing completion notification information and the like. Then, when the button image B1 (see FIG. 10) has been touched, it may be determined that an order to execute upload processing has been inputted, and processing may proceed to S417. Further, when the button image B41 or B42 (see FIG. 11) has been touched, it may be determined that selection of whether re-upload processing is allowed or disallowed to be carried out has been accepted, and processing may proceed to S440. Since the screen that is displayed in S415 is a screen that is displayed by a user operation, it is a screen that is highly likely to be confirmed by the user. Therefore, displaying an instruction accepting screen on the screen makes it possible to surely notify the user that data division processing has been executed. Further, since input of whether or not re-upload processing is allowed or disallowed to be carried out can be accepted on the screen that is displayed in S415, operating efficiency can be enhanced.

Fifth Modification

FIG. 18 shows a sequence diagram of a fifth modification. If the CPU 72 determines that the converted data conflicts with the upload limit (S591: YES), the CPU 72 proceeds to S595b. In S595b, the CPU 72 saves the upload data in the mediation server 60 or in the conversion server 200 without executing division processing. Then, the CPU 72 proceeds to S677b. Further, when the CPU 72 determines in S647 that the converted data conflicts with the upload limit (S647: YES), the CPU 72 proceeds to S649b. In S649b, the CPU 72 saves the upload data in the mediation server 60 or in the conversion server 200. In S677b, the CPU 72 transmits processing wait notification information to the multi-functional peripheral 10. Processing wait notification information is information to notify the multi-functional peripheral 10 that the mediation server 60 is waiting without executing upload processing. In S678b, the CPU 22 of the multifunctional peripheral 10 causes the processing wait notification information thus received to be stored in the memory 24. In S679b, the CPU 22 causes the display unit 14 to display a processing wait notification screen in accordance with the processing wait notification information. A processing wait notification screen is an image for notifying the user of the mediation server 60 is waiting without executing upload processing. Then, the CPU 22 returns to S415 (see FIG. 2), in which the CPU 22 causes the display unit 14 to display the main screen.

Figure 17:
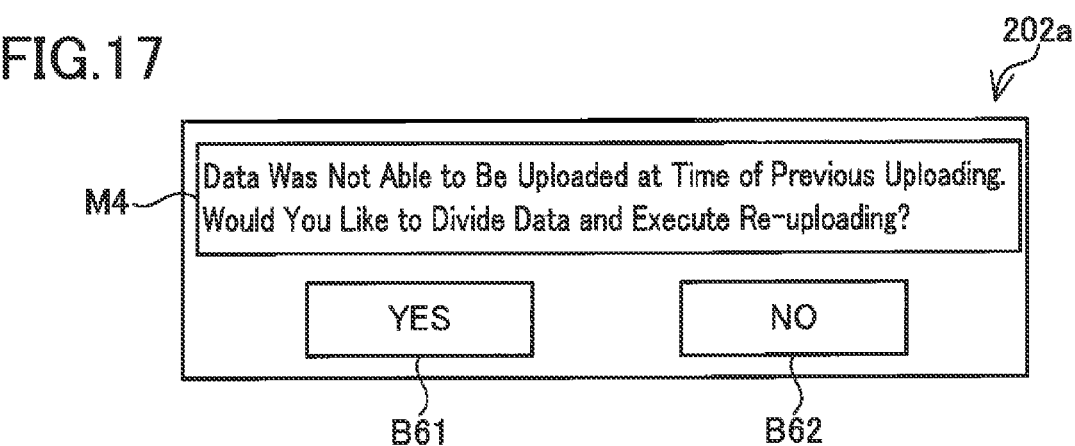
FIG. 17 shows an example of an instruction accepting screen display.

In response to re-access from the multi-function peripheral 10 (S417), it is only necessary for the CPU 72, in S424, to determine whether or not the upload data has been saved in the mediation server 60 or in the conversion server 200 without being saved in a contents server. If the determination is positive, the CPU 72 needs only proceed to S428, in which the CPU 72 transmits, to the multi-function peripheral 10, instruction accepting screen data for causing an instruction accepting screen 202a to be displayed. In S432, the CPU 22 needs only cause the display unit 14 to display the instruction accepting screen 202a shown in FIG. 17. The instruction accepting screen 202a contains a message image M4 and button images B61 and B62. The message image M4 is an image for notifying the user that upload was non-executable because of conflict with the upload limit at the time of execution of the previous uploading and that re-uploading is executable. The button images B61 and B62 are each an image for accepting selection of whether re-upload processing is allowed or disallowed to be carried out. The processing of S456 to S468 has already been described in the present embodiment, and as such, is not described here. When the mediation server 60 receives additional information in S470, the CPU 72 needs only proceed to S591. Details of the subsequent processing are not described here.

This makes it possible to wait for uploading of converted data in a case that the converted data conflicts with the upload limit. Then, when the user takes another opportunity to re-access the mediation server 60, it is possible to ask the user whether or not to dividedly upload data that was unable to be uploaded last time. This makes it possible to prevent data from being uploaded to the contents server in a mode that the user would not like.

Sixth Modification

There may be an embodiment in which the mediation server 60 does not include the division information database 76. In this case, it is only necessary, in S676, to transmit device identification information 411 to related information 414 to the multi-function peripheral 10 and store them in the multi-function peripheral 10. The device identification information 411 to related information 414 may be stored in an area in which MIB (referred to as Management Information Base) information is stored.

A first operation example of the sixth modification is described. When receiving access from the multi-function peripheral 10 next time (S417), the mediation server 60 may transmit, to the multi-function peripheral 10, transmission request information that requests the multi-function peripheral 10 to transmit the device identification information 411 to related information 414 stored in the multi-function peripheral 10 to the mediation server 60. The multi-function peripheral 10 may transmit the device identification information 411 to related information 414 to the mediation server 60 in accordance with the transmission request information. When receiving the device identification information 411 to related information 414 from the multi-function peripheral 10, the mediation server 60 may make a determination in S424. This eliminates the need for the mediation server 60 to include the division information database 76, thus making it possible to achieve a reduction in storage capacity of the memory 74.

A second operation example of the sixth modification is described. The main screen 201 that is displayed on the display unit 14 in S415 may contain an upload result display button image. When the upload result display button image is selected, the CPU 22 of the multi-function peripheral 10 may determine whether or not the device identification information 411 to related information 414 are stored in the memory 24. If the determination is negative, the CPU 22 may return to S415. If the determination is positive, the CPU 22 may cause the display unit 14 to display the instruction accepting screen 202a shown in FIG. 17. When the button image B61 or B62 is touched and selection of whether re-upload processing is allowed or disallowed to be carried out is accepted, the CPU 22 may, in S440, transmit re-uploading allowability selection information and the device identification information 411 to related information 414 to the mediation server 60. After this, the CPU 72 of the mediation server 60 may execute the processing of S444 and its subsequent steps with use of the device identification information 411 to related information 414 received from the multi-function peripheral 10.

Seventh Modification

On the main screen 201 (see FIG. 10) that is displayed on the display unit 14 in S415, an upload result display button image may be displayed instead of the button image B1 for accepting selection of the Internet function. The upload result display button image is an image for accepting input of an instruction to display, on the display unit 14, a success/failure result of uploading executed by accessing the mediation server 60 last time. When the upload result display button image is touched, button image identification information to identify the upload result display button image and the device identification information may be transmitted to the mediation server 60 in S417. Then, when the determination in S424 is positive (S424: YES), the processing of S428 and its subsequent steps may be executed, and when the determination is negative (S424: NO), the CPU 22 may return to S415, in which the main screen 201 is again displayed.

Alternatively, on the main screen 201 (see FIG. 10) that is displayed on the display unit 14 in S415, an upload result display button image may be displayed in addition to the button images B1 to B4. In this case, it may be further determined in S424 whether or not the upload result display button image has been touched. If it is determined in S424 that the upload result display button image has been touched and that division information corresponding to the multi-function peripheral 10 is stored in the division information database 76 (S424: YES), the processing of S428 and its subsequent steps may be executed. If it is determined in S424 that the button image B1 has been touched, the processing of S518 and its subsequent steps may be executed.

Other Modifications

The technology described herein is a technology in which in a case that data has been uploaded in a contents server in the first storage mode determined by the mediation server 60, the user can later re-upload data in the second storage mode that the user desires. Therefore, the first storage mode may be any mode, and does not need to be a mode in which data division processing is performed. In this case, in S675, the CPU 72 needs only determine whether or not uploading has been executed in the first storage mode determined by the mediation server 60. If the determination is positive (S675: YES), it is only necessary to store the device identification information 411 to related information 424 in the division information database 76. This makes it possible, for example, that even in a case that a file name or tag data has been created by the mediation server 60 without asking in uploading data to the contents server, the user can modify the file name or tag data to be one that the user desires.

The processing of transmitting storage mode designating information to the contents server in S666 and S668 can be executed in combination with another processing, depending on the specifications of the contents server. For example, such an embodiment may be possible in which in S661, related information-adding request information is transmitted together with converted data and storage mode designating information.

The processing of determining the conversion upper-limit data number in S556 may be performed by the conversion server 200.

The mediation server 60 may include a data storage mode database. The data storage mode database is a database in which data storage modes that can be used in a plurality of contents servers, respectively, are stored for each separate contents server. If instructed to execute re-uploading processing (S444: YES), the mediation server 60 needs only specify, with use of service identification information 412 in the division information database 76, a re-upload destination service that is a service on which the re-upload processing is to be executed. Then, a data storage mode to which the re-upload destination service corresponds needs only be searched for on the data storage mode database. In S452, the CPU 72 needs only generate data storage mode selection accepting screen data on the basis of the search result. This makes it possible to omit the communication processing of S446 and S450.

The mediation server 60 may store storable data type information. Then, the CPU 72, when receiving the server identification information in S529, needs only read out the storable data type information from the memory 74. Further, in S534, the CPU 72 needs only generate data format selection screen data on the basis of the storable data type information thus read out. This makes it possible to omit the communication processing of S531 and S533.

If the determination in S444 is negative (S444: NO), the CPU 72 may proceed to S512, in which the CPU 72 deletes the division information from the division information database 76. This makes it possible to delete device identification information 411 to related information 414 concerning data on which the user has decided not to execute re-upload processing.

The method for generating additional information is not limited to the method of causing the user to input additional information (see S468). Additional information may be automatically generated by the mediation server 60. In this case, the steps S464, S468, and S470 can be omitted. Further, options of additional information may be displayed on an additional information inputting screen 204 (see FIG. 13) to allow the user to select additional information. This makes it possible to save the user the trouble of inputting additional information.

In S676, authentication information may also be stored when the device identification information 411 to related information 414 are stored in the division information database 76. This makes it possible to communicate with the contents server with use of stored authentication information without receiving authentication information from the multi-function peripheral 10 in a case that re-upload processing is executed with use of division information (S444: YES).

The data format of upload data that is generated in S565 is not limited to a JPEG format, but may, for example, be a PDF format. In this case, in response to scanning of a document containing J pages, a single PDF file containing the J pages may be generated as a single data aggregate.

In the second uploading processing P3*a* (see FIG. 8), data division processing may be executed. In this case, it is only necessary to insert the processing of S591 to S676 between S589*a* and S667*a*. This makes it possible, in a case that conversion processing is not performed (S552: NO), to execute uploading even in a case that the upload data conflicts with the upload limit information.

Processing to determine whether the conversion processing must be performed, as indicated in S552, on the upload data need not necessarily be performed by the mediation server 60. For example, the processing may be performed by the multi-function peripheral 10. In this case, the CPU 22 of the multi-function peripheral 10 may determine whether conversion processing is necessary based on the selected data format accepted in S537 (that is, the data format when uploading to the contents server 100) and the data format of the upload data accepted in S547, and transmit the information indicating the determination result to the mediation server 60.

In S661, various configurations may be used for uploading converted data to the contents server 100. For example, the conversion server 200 may upload converted data to the contents server 100. In this case, in S653 the CPU 72 of the mediation server 60 may transmit, to the conversion server 200, upload request information to upload converted data to the contents server 100. Then, the CPU 272 of the conversion server 200 may transmit the converted data to the contents server 100, and receive save uploading result information from the contents server 100. The CPU 272 may transmit the received save uploading result information to the mediation server 60.

Further, converted data generated by the conversion server 200 may be uploaded to the contents server 100 via the multi-function peripheral 10. In this case, the subject performing the processing of S653 to S661 may be the multi-function peripheral 10 rather than the mediation server 60.

Various methods may be used to cause the multi-function peripheral 10 to execute wait processing (S639) to wait for completion of conversion processing. For example, the multi-function peripheral 10 may execute wait processing in receiving incomplete conversion notification information indicating that conversion processing has not been completed. The multi-function peripheral 10 may receive incomplete conversion notification information from the conversion server 200.

S571 is not limited to a configuration in which the conversion upload destination URL is requested to the mediation server 60. When the server to be accessed to execute conversion processing is fixed as the conversion server 200, an URL to access the conversion server 200 may be stored in advance in memory 24 of the multi-function peripheral 10. In this case, in S571 the URL to access the conversion server 200 may be read out from memory 24.

In S415, various configurations may be used to cause the display unit 14 to display the main screen. For example, when an order to display the main screen is input by the user to the operating unit 12, the multi-function peripheral 10 may access the mediation server 60. The mediation server 60 may create main screen data to cause display of the main screen, and may transmit the data to the multi-function peripheral 10. The multi-function peripheral 10 may display the main screen based on the main screen data.

In the present embodiment, a case was explained in which contents servers 100 and 110 are connected to the Internet 6; but three or more contents servers may be connected to the Internet 6.

According to the above, in general, the mediation server needs to be provided at least with "receiving of content data", "sending of the received content data", "sending of first screen information" and "changing of a storage mode of the content data". Specifically, the mediation server 60 needs to execute at least S583, S661 or S666, S428, and S482 or S500.

While the multi-function peripheral 10 was explained as an example of the image processing apparatus, the configuration is not limited thereto. The configuration may also adopt a sewing machine that performs stitching or quilting of a predetermined image based on instruction data. The configuration may also adopt a sewing machine that performs decorative stitching or sewing to form work pieces or products based on image data. The configuration may also adopt a 3D printer that generates 3D images via spraying or machining based on instruction data or the like. The configuration may also adopt work piece manufacturing equipment or product manufacturing equipment that forms work pieces or products via spraying or machining based on image data or the like. As an example of image data, 3D image data or 3D CAD data may be used. The configuration may also adopt a scanner that forms image data based on output data from a sensor which optically or electrically detects the profile of an object or based on output data from a sensor that is mounted on the object. The configuration may also adopt a scanner creates data indicating the shape or movement of an object based on the output from a sensor. As an example of image data, moving image data or 3D image data may be used.

In the embodiment, the case is described in which the CPUs 22, 72 and 272 of the multi-function peripheral 10, the mediation server 60 and the conversion server 200 execute processing according to software, but is not limited thereto. At least a part of functions provided according to the software may be provided by hardware such as a logic circuit.

The invention claimed is:

1. A relaying device comprising:
   a network interface configured to connect with a network;
   a processor coupled to the network interface; and
   a memory storing computer-readable programs, the computer-readable programs, when executed by the processor, causing the relaying device to perform:
   receiving content data from a particular image processing device via the network interface;
   determining whether or not it is necessary to execute a data processing to the received content data;
   executing the data processing to the received content data when it is determined that it is necessary to perform the data processing,
   dividing the received content data into a plurality of groups;
   determining a first storage mode that includes: adding first file names or first tag data containing a predetermined common character string created by the relaying device to each of the pieces of the divided content data, and putting the pieces of the divided content data in a first folder that is created in a server device and that is created by the relaying device, the server device being connected with the network via the network interface;

sending, to the server device, the divided content data and a first particular instruction, the first particular instruction instructing to store the divided content data in the first storage mode in the server device;

storing first storage mode information and first device identification information in association in the memory of the relaying device in a case that the divided content data was sent to the server, the first storage mode information indicating that the divided content data was stored in the first storage mode, and the first device identification information being information for identifying the particularly image processing device;

sending first screen information to the particular image processing device via the network interface, in a case that access start information and second device identification information are received from one of the plurality of image processing devices after the first storage mode information was stored in the memory, and the received second device identification information matches the first device identification information stored in the memory, wherein the first screen information includes instructions for displaying a first screen on a display provided in the particular image processing device, and for accepting a changing instruction to change the first storage mode to a second storage mode, the first screen information is information generated based on the first storage mode information stored in the memory, the second device identification information is information for identifying the one image processing device, and the second storage mode is at least one of:
when the first storage mode is adding the first file names or the first tag data, the first file names or the first tag data are changed to a second name or second tag data that a user desires,
when the first storage mode is putting the pieces of the divided content data in the first folder, the pieces of the divided content data are moved to a second folder that the user desires, and
when the first storage mode is adding the first file names or the first tag data, the pieces of the divided content data are moved to the second folder that the user desires;

receiving first information from the particular image processing device via the network interface after sending the first screen information to the particular image processing device, the first information indicating that the changing instruction is accepted;

sending second particular instruction to the server device in a case that the first information is received, the second particular instruction instructing to store the content data in the server device in the second storage mode.

2. The relaying device according to claim 1, wherein the dividing includes dividing the received content data into X pieces, the X is an integer of two or more, the first file names or the first tag data includes:

a first character string indicating that the X pieces of the divided content data are created by the dividing; and the second character string indicating what number in the X pieces each of the X pieces of the divided content data is, the computer-readable programs further cause the relaying device to perform sending second screen information to the particularly image processing device via the network interface, in a case that the received content data is divided, the second screen information includes instructions for displaying a second screen on the display provided in the particular image processing device, the second screen indicating that the received content data has been divided by the relaying device.

3. The relaying device according to claim 1, wherein the relaying device is configured to communicate with a plurality of server devices, and the computer-readable programs further cause the relaying device to perform:

sending third screen information to the particular image processing device via the network interface, in a case that access start information is received from the particular image processing device, wherein the access start information indicates that an access to the server device is to be started, and the third screen information is information for displaying, on the display of the particular image processing device, a third screen for accepting a selection of a selected server device, being the server device to be accessed, from among the plurality of server devices; and storing, in a case that selected server identification information indicating the selected server device is received from the particular image processing device via the network interface after the third screen information was sent to the particular image processing device, the selected server identification information and first device identification information that identifies the particular image processing device, in association in the memory of the relaying device, the sending of the content data includes sending the content data to the selected server device indicated by the received selected server identification information, in a case that the selected server identification information is received from the particular image processing device and the content data instructed by the particular image processing device has been received after the third screen information was sent, the sending of the first screen information includes sending the first screen information to the particular image processing device, in a case that the access start information is received from the particular image processing device after the content data was sent to the selected server device, wherein the first screen information is information for displaying, on a display of the particular image processing device, a first screen configured to accept the selection of the selected server device and to accept the changing instruction to change the first storage mode to the second storage mode, the sending of the second particular instruction includes sending the second particular instruction instructing to change the storage mode of the content data, stored in the selected server device identified by the selected server identification information stored in association with the first device identification information, from the first storage mode to the second storage mode, in a case that the instruction information is received from the particular image processing device via the network interface after the first screen information was sent, and
in a case that the selected server identification information and the content data are received from the particular image processing device via the network interface after the first screen information was sent, the sending of the content data includes sending the content data to the selected server device indicated by the received selected server identification information via the network interface.

4. The relaying device according to claim 1, wherein
the sending of the received content data to the server device and the sending of the first screen information to the particular image processing device are performed, in a case that access start information, first device identification information, and the content data instructed by the particular image processing device are received from the particular image processing device via the network interface,
   wherein the access start information indicates that an access to the server device is to be started, and
   the first device identification information is information for identifying the particular image processing device,
the storage mode of the content data stored in the server device is changed from the first storage mode to the second storage mode,
in a case that the access start information and the first information are received from the particular image processing device after the content data had been sent to the server device and the first screen information had been sent to the particular image processing device, and
   in a case that the access start information and the content data instructed by the particular image processing device were sent from the particular image processing device after the content data had been sent to the server device and the first screen information had been sent to the particular image processing device, the received content data is sent to the server device.

5. The relaying device according to claim 1, wherein
the second particular instruction comprises second information instructing the server device to substitute the first storage mode with the second storage mode for storing the content data in the server device.

6. The relaying device according to claim 1, wherein
the computer-readable programs further cause the relaying device to perform receiving, from the server device via the network interface, the content data stored in the server device in the first storage mode after receiving the first information indicating that the changing instruction has been accepted, and
the second particular instruction comprises the received content data and third information to have the received content data stored in the server device in the second storage mode.

7. The relaying device according to claim 6, wherein
the receiving of the content data stored in the server device in the first storage mode and the sending of the received content data to have the received content data stored in the server device by using the second storage mode are performed, in a case that the server device is not provided with an Application Programming Interface for changing the storage mode of the content data stored in the server device from the first storage mode to the second storage mode.

8. The relaying device according to claim 1, wherein
the sending of the first screen information includes sending the first screen information for displaying the first screen,
   the first screen is a screen:
      including images, each indicating corresponding one of the plurality of storage modes; and
      for accepting an operation to select the second storage mode from among the plurality of storage modes.

9. The relaying device according to claim 1, wherein
the relaying device is configured to communicate with a plurality of server devices, and
the computer-readable programs further cause the relaying device to perform sending third screen information to the particular image processing device via the network interface when information is received from the particular image processing device,
   wherein the information indicates that an access to a server device is to be started, and
   the third screen information is information for displaying, on the display of the particular image processing device, a third screen for accepting a selection of a selected server device, being the server device to be accessed, from among the plurality of server devices,
in a case that selected server identification information indicating the selected server device is received from the particular image processing device via the network interface after the third screen information was sent to the particular image processing device, the sending of the content data includes sending the content data to the selected sever device indicated by the received selected server identification information via the network interface, and
the sending of the first screen information includes:
   searching one or more storage modes that the selected server device can use from among the plurality of storage modes;
   generating the first screen information for displaying the searched one or more storage modes on the display of the particular image processing device; and
   sending the generated first screen information to the particular image processing device.

10. The relaying device according to claim 1, wherein
the server device is configured capable of storing various types of data by designating a storage region for each of the data, and
at least one of the first storage mode and the second storage mode is a mode that designates a predeterminedly set storage region as a location where the content data is to be stored.

11. The relaying device according to claim 1, wherein
the computer-readable programs further cause the relaying device to perform:
   sending third screen information to the particular image processing device via the network interface, in a case that first information is received from the particular image processing device via the network interface after the first screen information had been sent to the particular image processing device,
      wherein the third screen information is information for displaying a third screen for accepting an input of at least one of the file name and the tag data on the display of the particular image processing device, and the first information indicates a changing instruction to change to a mode in which the content data is stored with the at least one of the file name and the tag data being added; and receiving the at least one of the file name and the tag data of which input was accepted in the particular image processing device from the particular image processing device via the network interface, at least one of the first storage mode and the second storage mode is a mode that stores the content data by adding at least one of a file name and tag data to the content data, and the second storage mode is a mode in which the at least one of the file name and the tag data is added to the content data received in the receiving of the at least one of the file name and the tag data.

12. The relaying device according to claim 1, wherein the computer-readable programs further cause the relaying device to perform generating divided content data being divided as a result of a process carried out on the received content data received from the particular image processing device, wherein the sending of the received content data includes sending the divided content data to the server device, and the first storage mode and the second storage mode are both modes that associate the divided content data, which were divided from the same received content data, to each other.

13. A relaying device comprising:
a network interface configured to connect with a network;
a processor coupled to the network interface; and
a memory storing computer-readable programs, the computer-readable programs, when executed by the processor, causing the relaying device to perform:
receiving content data from a particular image processing device via the network interface;
storing the received content data in the memory of the relaying device in association with first device identification information that identifies the particular image processing device in the memory of the relaying device, in a case that access start information, the first device identification information and the content data instructed by the particular image processing device are received from the particular image processing device via the network interface,
the access start information indicates that an access to a server device is to be started, and
the first device identification information is information for identifying the particular image processing device;
sending first screen information to the particular image processing device via the network interface in a case that the access start information is received from the particular image processing device after the content data was stored in the memory of the relaying device,
wherein the first screen information includes instructions for displaying a first screen on a display provided in the particular image processing device,
the first screen is for accepting a selection of a storage mode among a plurality of storage modes that is predeterminedly set, and
the plurality of storage modes includes: adding first file names or first tag data containing a predetermined common character string created by the relaying device to the content data, and putting the pieces of the content data in a first folder that is created in the server device and that is created by the relaying device; and sending third particular instruction to the server device in a case that fourth information indicating the selected storage mode is received, the third particular instruction instructing to store the content data in the server device by using a storage mode indicated by the fourth information.

14. The relaying device according to claim 13, wherein the storing of the received content data includes storing the received content data in association with the first device identification information in the memory of the relaying device, in a case that access start information, first device identification information, and the content data instructed by the particular image processing device are received from the particular image processing device via the network interface, wherein the access start information indicates that an access to the server device is to be started, and the first device identification information is information for identifying the particular image processing device, and the sending of the third particular instruction includes sending the content data stored in association with the first device identification information to the server device so that the content data is stored in the server device by using a storage mode indicated by the fourth information, in a case that the access start information and the fourth information are received form the particular image processing device after the content data had been stored in the memory of the relaying device and the first screen information had been sent to the particular image processing device.

15. The relaying device according to claim 13, wherein the computer-readable programs further cause the relaying device to perform receiving an instruction on a storage mode, by which the received content data is to be stored in the server device, from the particular image processing device, the received content data is stored in the server device after the instruction on the storage mode has been received, the sending of the first screen information includes sending the first screen information to the particular image processing device via the network interface, in a case that the received content data needs to be stored in the server device in a storage mode that is not instructed from the particular image processing device.

16. The relaying device according to claim 15, wherein the computer-readable programs further cause the relaying device to perform receiving process designating information that designates a process to be carried out on the content data from the particular image processing device via the network interface, and the sending of the first screen information includes sending the first screen information to the particular image processing device via the network interface, in a case that the received content data needs to be stored in the server device in a storage mode that is not instructed from the particular image processing device as a result of having carried out the process designated by the process designating information on the content data.

17. The relaying device according to claim 15, wherein the computer-readable programs further cause the relaying device to perform receiving process designating information that designates a process to be carried out on the content data, from the particular image processing device via the network interface, and the sending of the first screen information includes sending the first screen information to the particular image processing device via the network interface, in a case that the received content data needs to be stored in the server device in a storage mode that is not instructed from the particular image processing device as a result of having carried out a process different from the process designated by the process designating information on the content data.

18. An image processing device comprising:

a network interface configured to connect with a network;

a processor coupled to the network interface;

a display; and a control device configured to perform:

sending, via the network interface, content data to a relaying device which is connected with the network to have a process to store the content data in a server device carried out by the relaying device, the server device being connected with the network and configured to store uploaded data;

displaying an first screen on the display of the image processing device based on first storage mode information, in a case that the first storage mode information indicating a first storage mode by which the content data is stored in the server device is received from the relaying device via the network interface after the content data had been sent to the relaying device, wherein the first screen is for accepting an input of a changing instruction to change a storage mode of the content data stored in the server device from the first storage mode to a second storage mode, the first storage mode includes: adding first files names or first tag data containing a predetermined common character string created by the relaying device to the content data, and putting the content data in a first folder of the server device that is created in the server device and that is created by the relaying device, and the second storage mode is at least one of:

when the first storage mode is adding the first file names or the first tag data, the first file names or the first tag data are changed to a second name or second tag data that a user desires, when the first storage mode is putting the content data in the first folder, the content data is moved to a second folder of the server device that the user desires, and when the first storage mode is adding the first file names or the first tag data, the content data is moved to the second folder that the user desires; and sending instruction information indicating the changing instruction to the relaying device via the network interface, in a case that the input of the changing instruction is accepted after the first screen had been displayed on the display.

19. The image processing device according to claim 18, wherein the displaying of the first screen includes displaying a start instructing screen for accepting an input of an access start instruction to access the server device, in a case that a predetermined condition is met, the control device is further configured to perform sending access start information to the relaying device via the network interface, in a case that the input of the access start instruction is accepted after the start instructing screen was displayed on the display, wherein the access start information indicates that an access to the server device is to be started, the content data is sent after the access start information was sent, and the displaying of the first screen includes displaying the first screen, in a case that the content data had been sent, the predetermined condition had been met, the start instructing screen had been displayed, the access start information had been sent, and then the first storage mode information had been received.

20. The image processing device according to claim 18, wherein the relaying device is configured to communicate with a plurality of server devices, the displaying of the first screen includes displaying a third screen on the display in a case that the predetermined condition is met, wherein the third screen is for accepting a selection of a selected server device, which is a server device to be accessed, from among the plurality of server devices, the control device is further configured to perform:

sending selected server identification information to the relaying device via the network interface, in a case that the selection of the selected server device is accepted after the third screen was displayed on the display, wherein the selected server identification information indicates the selected server device; and storing, in a case that the first storage mode information is received after the selected server identification information and the content data had been sent, the received first storage mode information in the memory of the image processing device, the displaying of the first screen includes displaying the first screen capable of accepting the selection of the selected server device and capable of accepting the input of the changing instruction on the display, in a case that the predetermined condition is met after the first storage mode information was stored, the sending of the selected server identification information includes sending the selected server identification information and the sending of the content data includes sending the content data, in a case that the selection of the selected server device is accepted after the first screen was displayed, and the sending of the instruction information includes sending the instruction information in a case that the input of the changing instruction is accepted after the first screen was displayed.

21. The image processing device according to claim 18, wherein the control device is further configured to perform:

displaying a start instructing screen for accepting an input of an access start instruction to access the server device, in a case that a predetermined condition is met; and sending access start information to the relaying device via the network interface, in a case that the input of the access start instruction is accepted after the start instructing screen was displayed on the display, wherein the access start information indicates that an access to the server device is to be started, the control device is further configured to perform storing, in a case that the content data is sent after the access start information had been sent, and the first storage mode information is received after the content data had been sent, the received first storage mode information in the memory of the image processing device, the displaying of the first screen includes displaying the first screen capable of accepting the input of the access start instruction and capable of accepting the input of the changing instruction on the display, in a case that the predetermined condition is met after the first storage mode information was stored, the sending of the access start information and the sending of the content data are performed, in a case that the input of the access start instruction is accepted after the first screen was displayed, and the sending of the access start information and the sending of the instruction information are performed, in a case that the input of the changing instruction is accepted after the first screen was displayed.

22. A system comprising an image processing device and a relaying device, the image processing device comprising:
   a first network interface configured to connect with a network;
   a display; and
   a control device coupled to the first network interface, the relaying device comprising:
   a second network interface configured to connect with the network;
   a processor coupled to the second network interface; and
   a memory storing computer-readable programs, wherein the control device of the image processing device is configured to perform sending, via the first network interface, content data to the relaying device so that a process to store the content data in a server device is carried out by the relaying device, the server device being connected with the network and configured to store uploaded data;

the computer-readable programs, when executed by the processor of the relaying device, cause the relaying device to perform:
   receiving content data from the image processing device via the second network interface,
   dividing the received content data into a plurality of groups;
   determining a first storage mode that includes: adding first file names or first tag data containing a predetermined common character string created by the relaying device to each of the pieces of the divided content data, and putting the pieces of the divided content data in a first folder that is created in the server device and that is created by the relaying device;
   sending, via the second network interface, the divided content data to the server device to have the divided content data stored in the server device in the first storage mode;
   storing first storage mode information and first device identification information in association in the memory of the relaying device in a case that the divided content data was sent to the server device,
      the first storage mode information indicating that the divided content data was stored in the first storage mode, and
      the first device identification information being information for identifying the image processing device; and
   sending first screen information to the image processing device that is a sending source of the content data via the second network interface, after the first storage mode information was stored in the memory,
   wherein the first screen information is information for displaying an first screen, for accepting a changing instruction to change a storage mode of the content data stored in the server device from the first storage mode to a second storage mode, on the display provided in the image processing device, and
   the second storage mode is at least one of:
      when the first storage mode is adding the first file names or the first tag data, the first file names or the first tag data are changed to a second name or second tag data that a user desires,
      when the first storage mode is putting the pieces of the divided content data in the first folder, the pieces of the divided content data are moved to a second folder that the user desires, and
      when the first storage mode is adding the first file names or the first tag data, the pieces of the divided content data are moved to the second folder that the user desires, the control device of the image processing device is further configured to perform:
   displaying the first screen on the display of the image processing device based on the first screen information, in a case that the first screen information is received from the relaying device via the first network interface; and
   sending instruction information indicating the changing instruction to the relaying device via the first network interface, the computer-readable programs further cause the relaying device to perform changing a storage mode of the divided content data stored in the server device from the first storage mode to the second storage mode, in a case that the instruction information is received from the image processing device via the second network interface.

* * * * *